(12) United States Patent
Takeuchi

(10) Patent No.: US 8,395,344 B2
(45) Date of Patent: Mar. 12, 2013

(54) MOTOR CONTROL METHOD AND DEVICE

(75) Inventor: Kesatoshi Takeuchi, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 13/288,560

(22) Filed: Nov. 3, 2011

(65) Prior Publication Data

US 2012/0081053 A1    Apr. 5, 2012

Related U.S. Application Data

(63) Continuation of application No. 12/182,157, filed on Jul. 30, 2008, now Pat. No. 8,080,953.

(30) Foreign Application Priority Data

Aug. 6, 2007 (JP) .................................. 2007-204273
May 7, 2008 (JP) .................................. 2008-121210

(51) Int. Cl.
*G05B 11/28* (2006.01)
(52) U.S. Cl. .............. 318/599; 318/400.01; 318/400.02; 318/400.32; 318/376
(58) Field of Classification Search .................. 318/376, 318/400.01, 400.02, 400.14, 599, 799, 800, 318/801, 811, 430, 374, 568.11, 568.12, 318/568.22; 388/819, 831
See application file for complete search history.

(56) References Cited

U.S. PATENT DOCUMENTS

| | | | |
|---|---|---|---|
| 6,222,334 B1 | 4/2001 | Tamagawa et al. | |
| 6,242,875 B1 * | 6/2001 | Kusaka et al. ........... | 318/400.32 |
| 6,247,548 B1 | 6/2001 | Hayashi et al. | |
| 6,605,912 B1 | 8/2003 | Bharadwaj et al. | |
| 7,126,301 B2 * | 10/2006 | Nishihara et al. ......... | 318/400.27 |
| 7,151,354 B2 | 12/2006 | Yoshinaga et al. | |
| 7,211,974 B2 | 5/2007 | Takeuchi | |
| 7,227,320 B2 * | 6/2007 | Takayama et al. ....... | 318/400.01 |
| 7,279,858 B2 | 10/2007 | Takeuchi | |
| 7,893,638 B2 * | 2/2011 | Akama et al. ............ | 318/400.14 |
| 2005/0258790 A1 | 11/2005 | Takeuchi | |

FOREIGN PATENT DOCUMENTS

JP   02-106191   4/1990
JP   2005-333707   12/2005

* cited by examiner

*Primary Examiner* — Antony M Paul
(74) *Attorney, Agent, or Firm* — Harness, Dickey & Pierce, P.L.C.

(57) ABSTRACT

A control device includes a drive controller that controls the driving of an electromagnetic coil, and a regeneration controller that controls the regeneration of power from the electromagnetic coil. The drive controller includes an excitation interval setting unit that sets excitation and non-excitation intervals such that voltage is applied to the electromagnetic coil during the excitation interval but is not applied during the non-excitation interval. The excitation and non-excitation intervals are symmetrical with centers that respectively correspond to the $\pi/2$ and $\pi$ phase points of the induced voltage waveform. The regeneration controller includes a regeneration interval setting unit that sets regeneration and non-regeneration intervals such that power is regenerated from the electromagnetic coil during the regeneration interval but is not regenerated during the non-regeneration interval. The regeneration and non-regeneration intervals are symmetrical with centers that respectively correspond to the $\pi/2$ and $\pi$ phase points of the induced voltage waveform.

2 Claims, 24 Drawing Sheets

Fig.3A
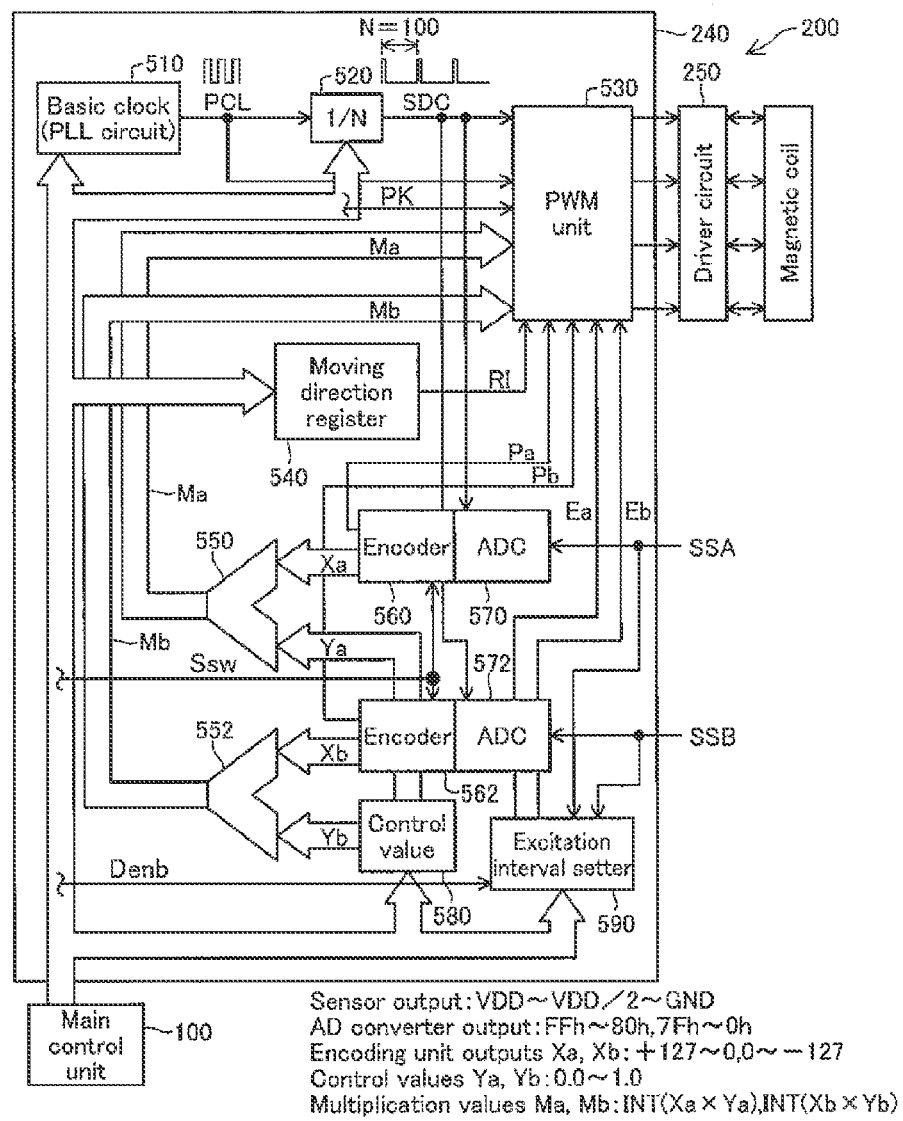
Fig.3B
Fig.3C
Fig.3D
Fig.3E
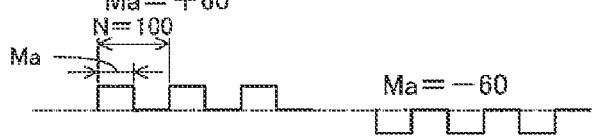

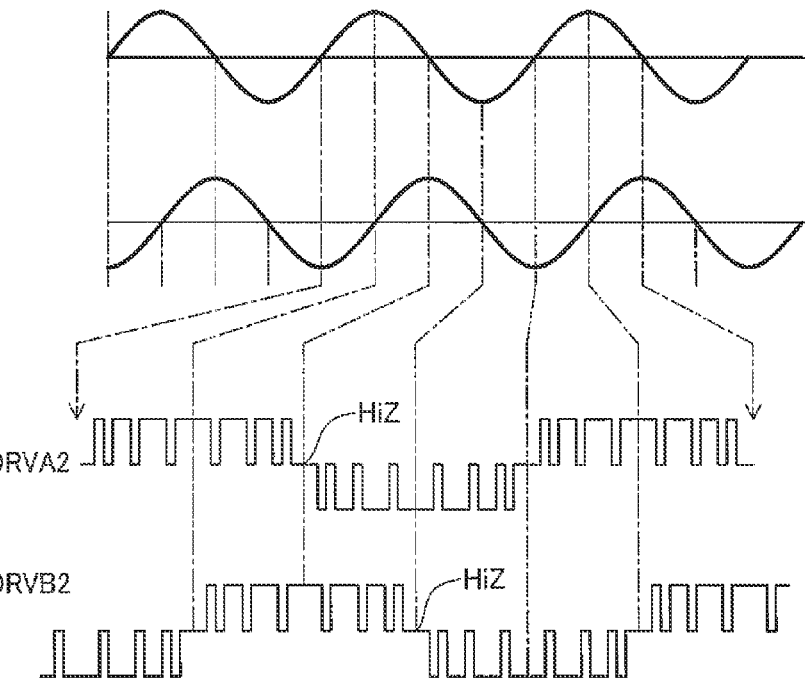
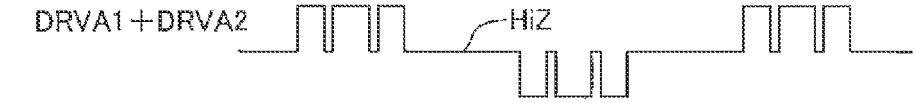
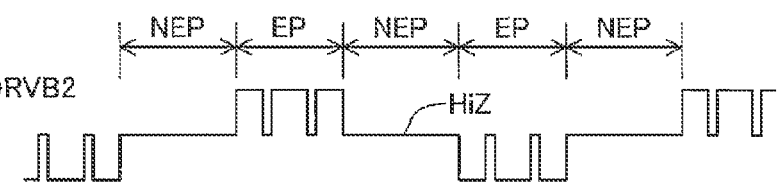

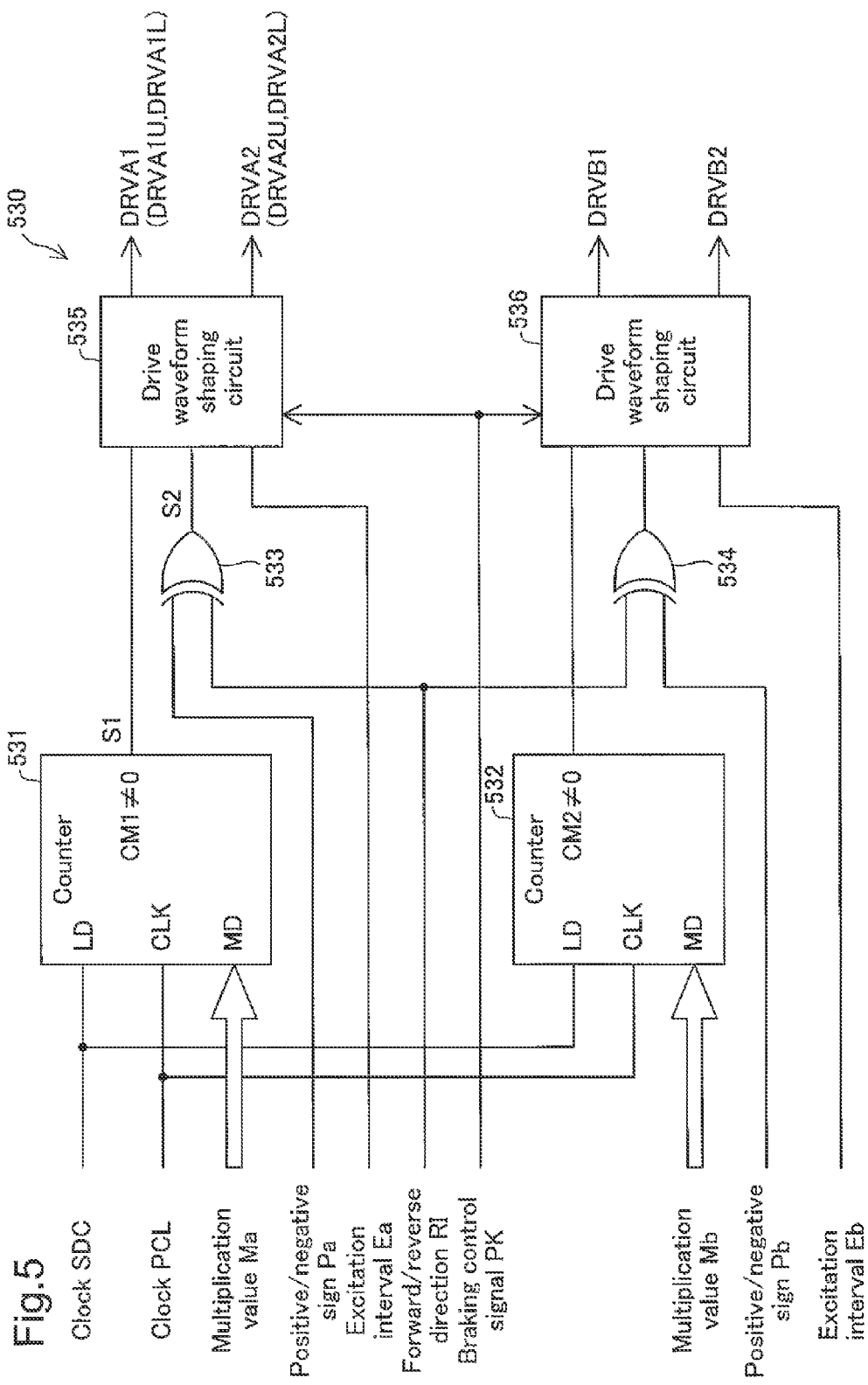

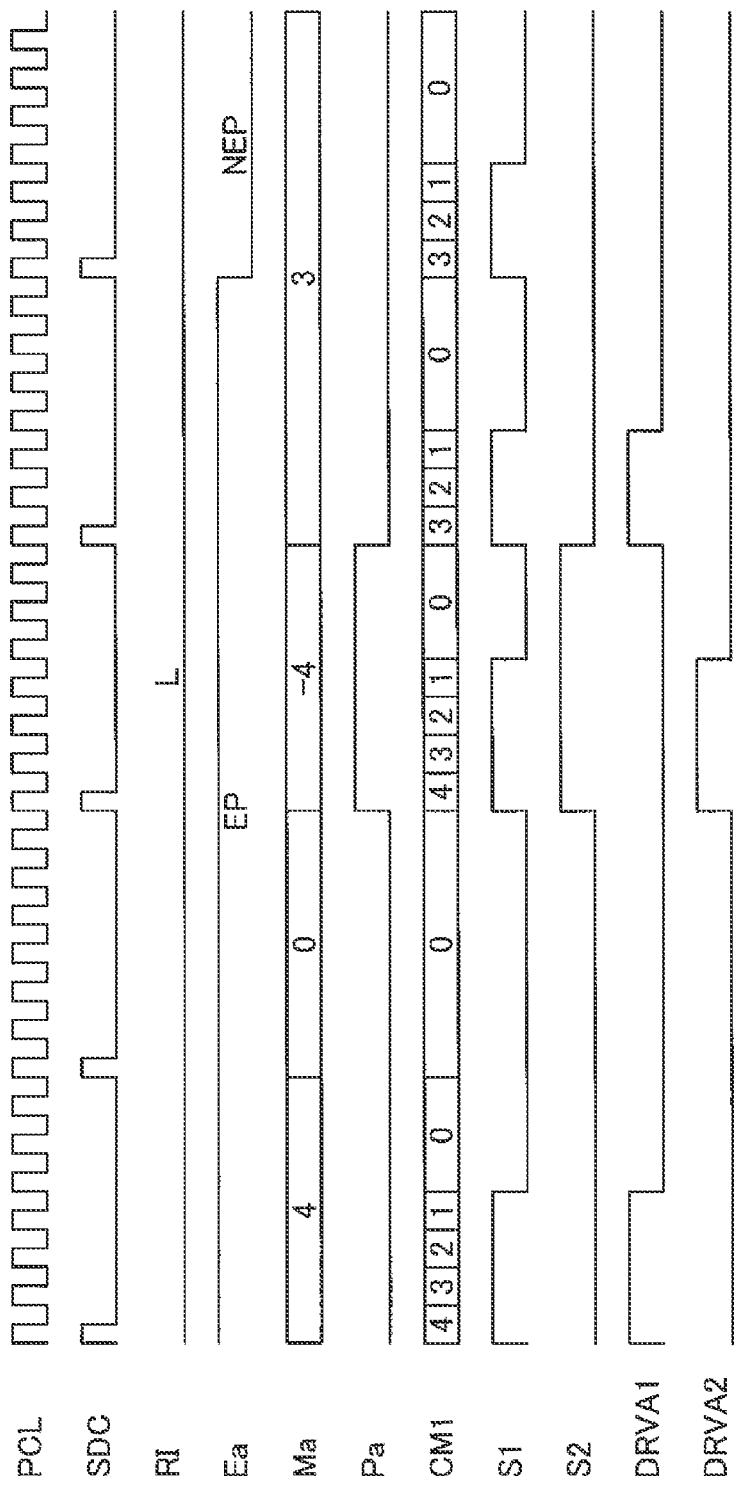
Fig.6 During forward rotation (RI = "L")

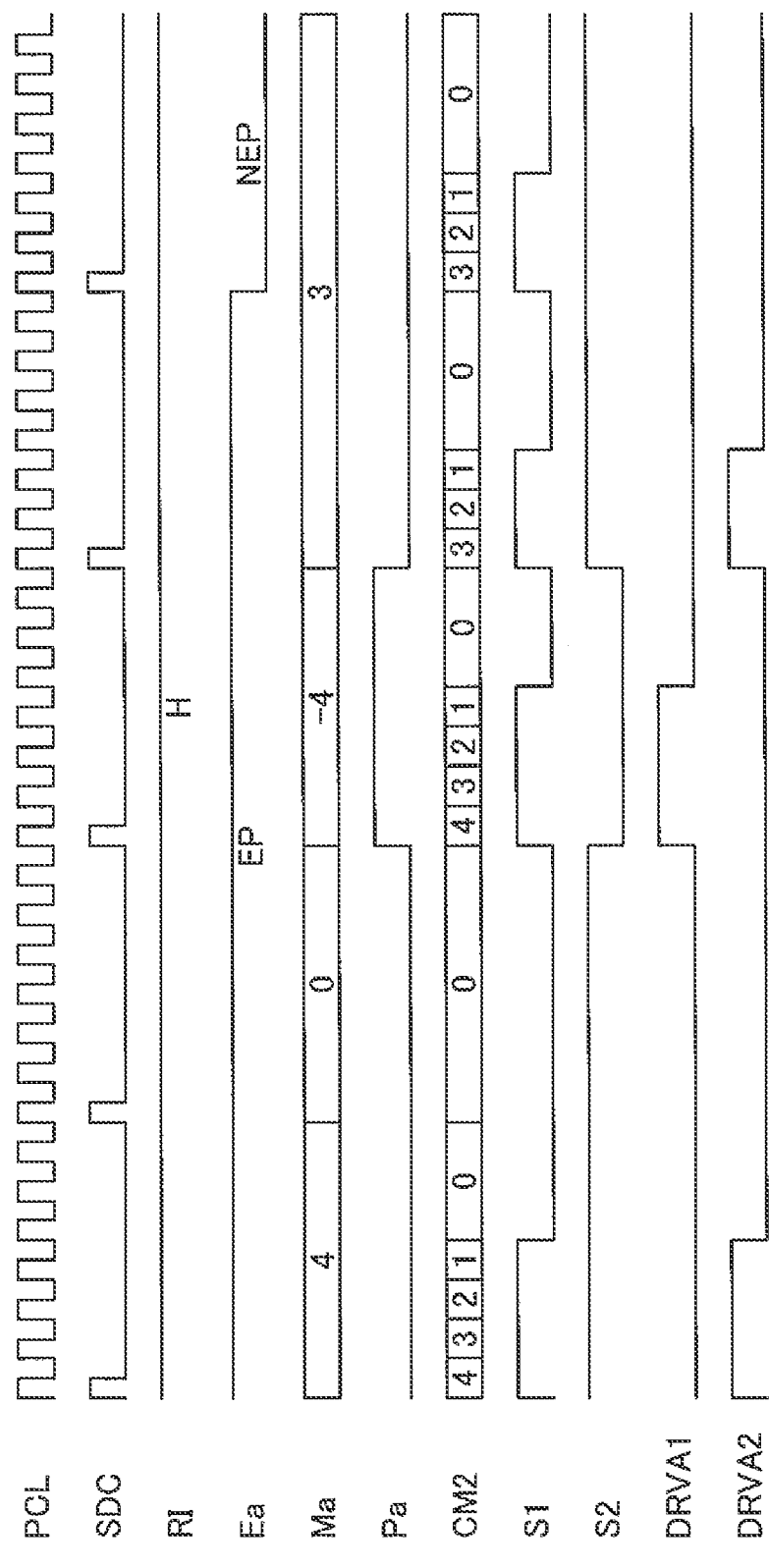

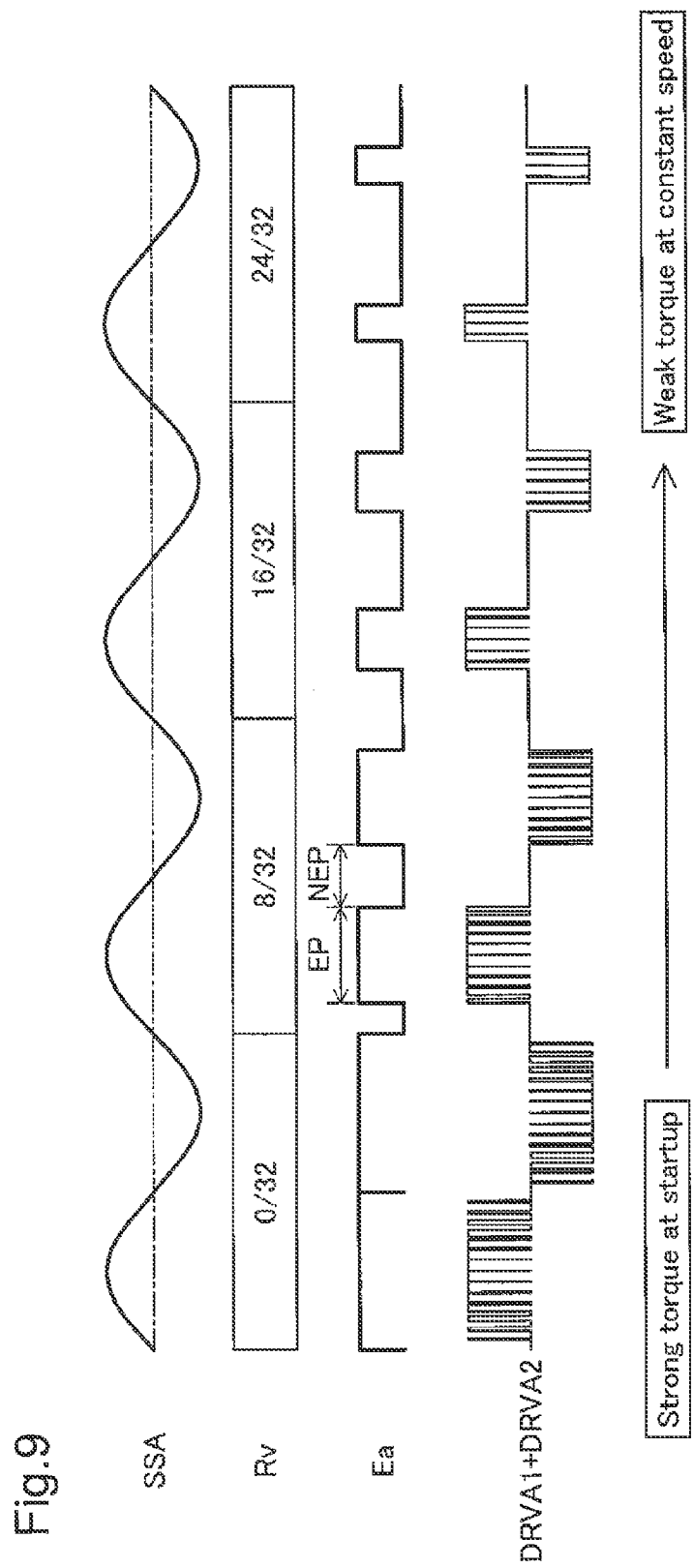

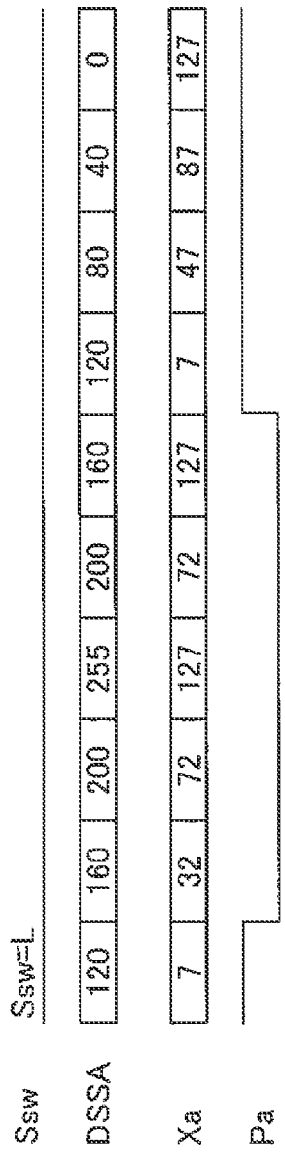
Fig.11A  When Ssw = 0 (sine wave drive)
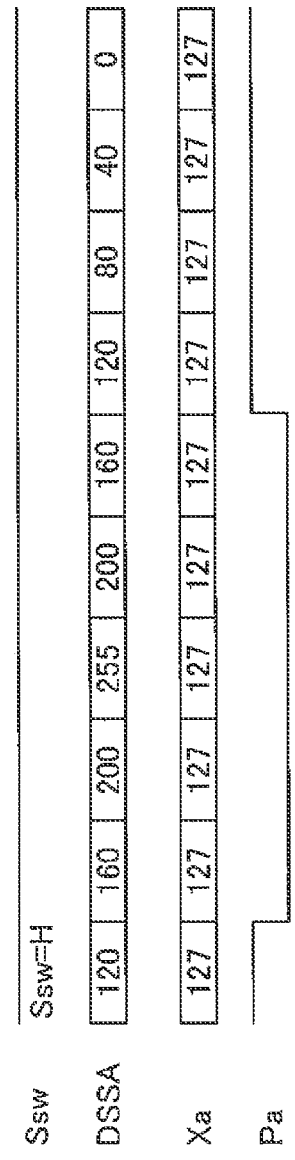
Fig.11B  When Ssw = 1 (rectangular wave drive)

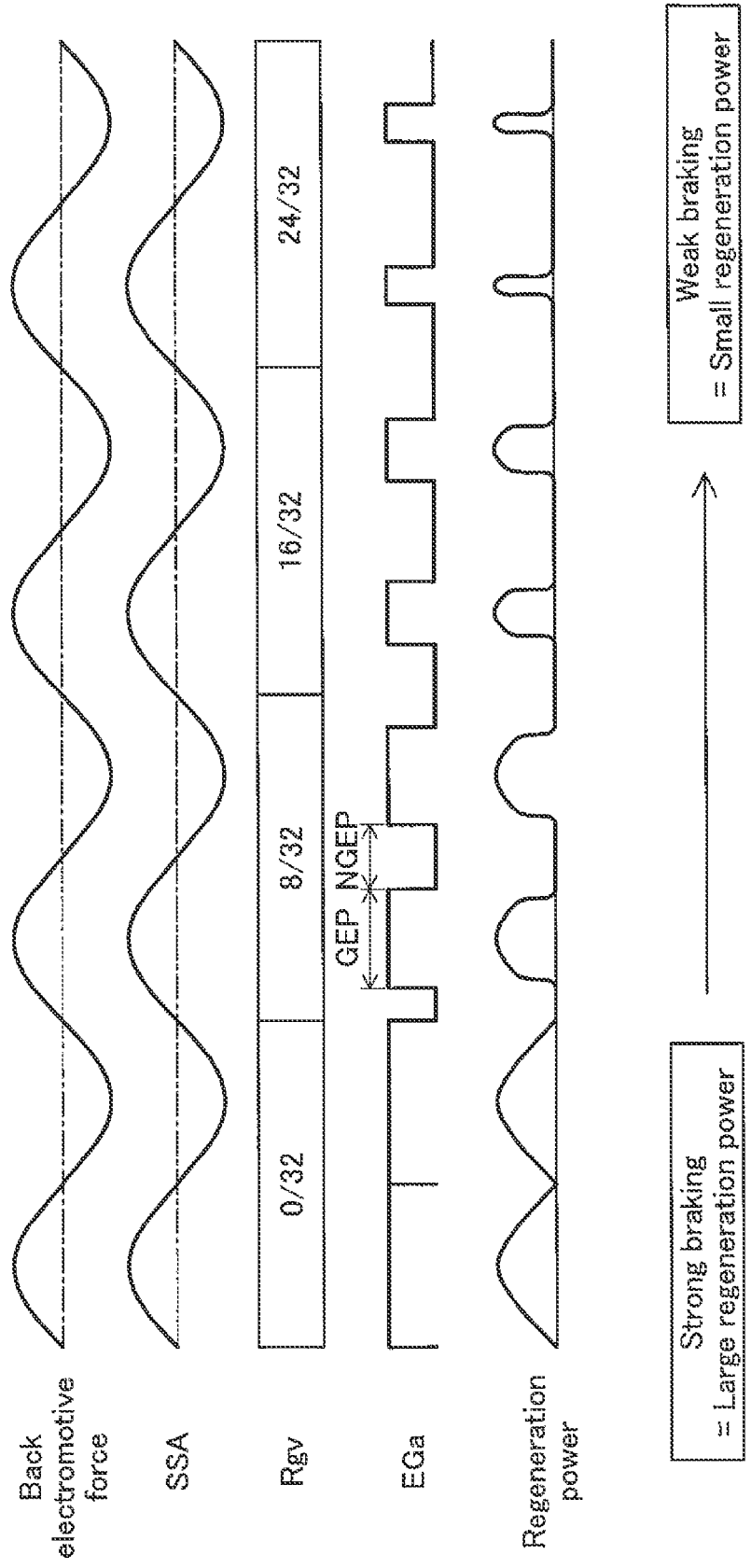

Fig.16A  Fig.16B  Fig.16C
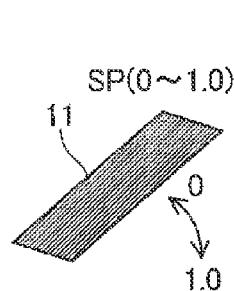
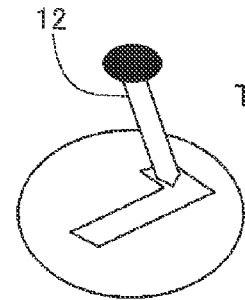
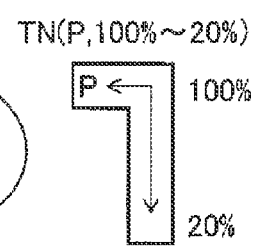
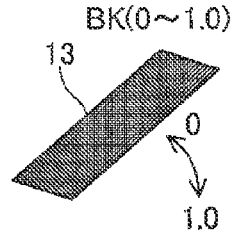
Fig.16D
Operation example
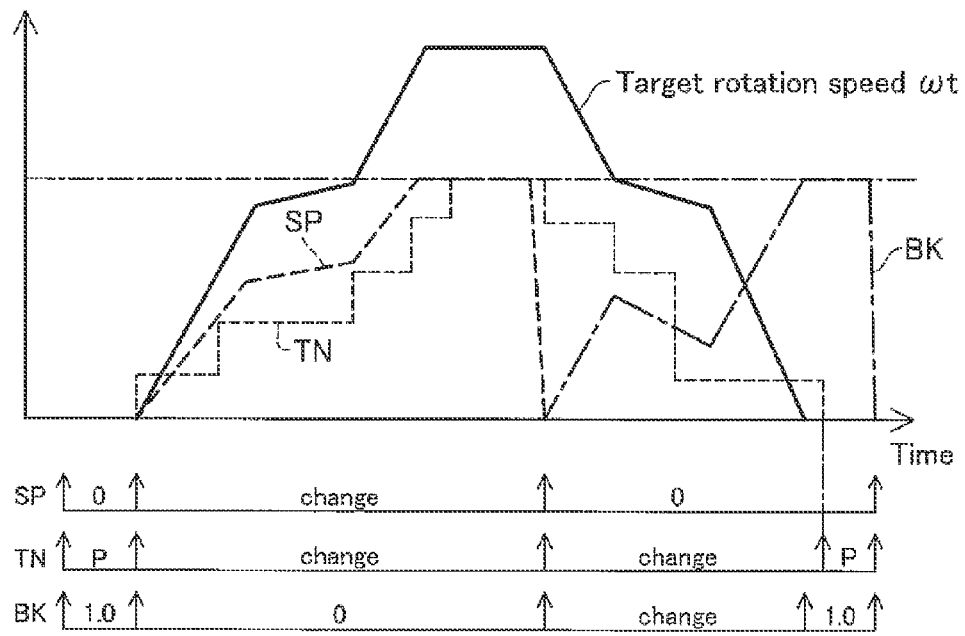

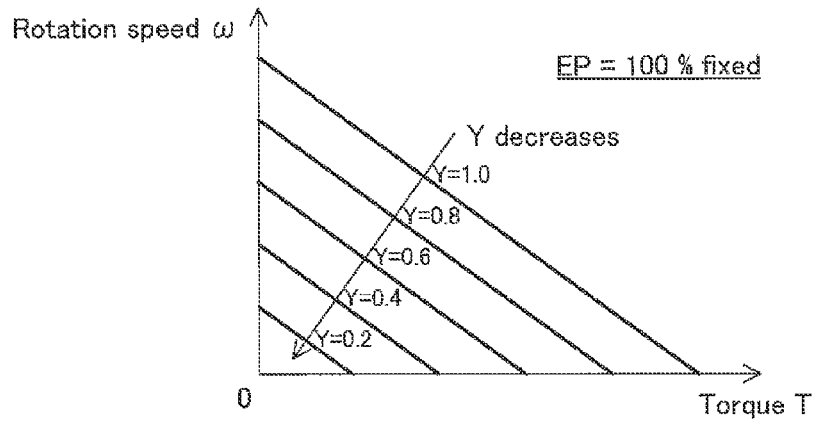
Fig.19A Torque-rotation speed characteristics (changes due to control value Y)
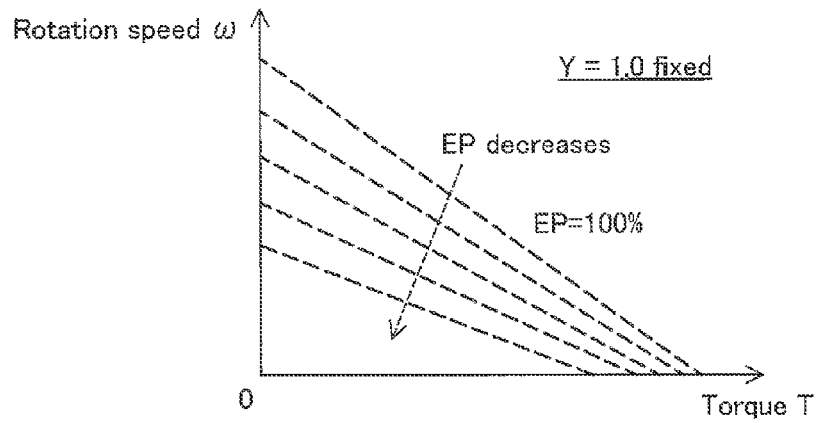
Fig.19B Torque-rotation speed characteristics (changes due to excitation interval EP)
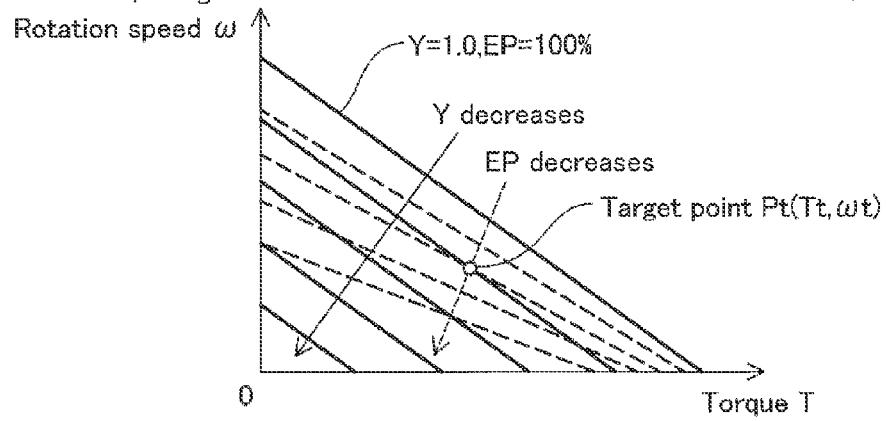
Fig.19C Torque-rotation speed characteristics (changes due to control value Y and excitation interval EP)

Printer implementation example

Operation example

MOTOR CONTROL METHOD AND DEVICE

CROSS-REFERENCE TO RELATED APPLICATIONS

This application is a continuation application of U.S. Ser. No. 12/182,157 filed Jul. 30, 2008 which claims priority to Japanese Patent Applications No. 2007-204273 filed on Aug. 6, 2007, and No. 2008-121210 filed on May 7, 2008, the disclosures of which are hereby incorporated by reference in their entireties.

BACKGROUND OF THE INVENTION

1. Field of the Invention

The present invention relates to electric motor control technology.

2. Description of the Related Art

The item noted in the patent reference below is a known example of a control device for performing drive and regeneration with an electric motor.

[Patent Reference 1] Unexamined Patent Bulletin No. 2005-333707

However, with the conventional motor control devices, there were cases when mechanisms for respectively improving the drive and regeneration efficiency were not sufficient.

SUMMARY OF THE INVENTION

An object of the present invention is to provide technology for respectively improving the drive and regeneration efficiency of an electric motor.

According to an aspect of the present invention, there is provided a control device including a drive control unit that performs control for driving the electromagnetic coil, and a regeneration control unit that performs control for regenerating power from the electromagnetic coil. The drive control unit includes an excitation interval setting unit that sets an excitation interval and a non-excitation interval such that voltage is applied to the electromagnetic coil during the excitation interval while not applied to the electromagnetic coil during the non-excitation interval. The excitation interval has a symmetrical shape whose center corresponds to a $\pi/2$ phase point of the induced voltage waveform, and the non-excitation interval has a symmetrical shape whose center corresponds to the $\pi$ phase point of the induced voltage waveform. The regeneration control unit includes a regeneration interval setting unit that sets a regeneration interval and a non-regeneration interval such that power is regenerated from the electromagnetic coil during the regeneration interval while not regenerated from the electromagnetic coil during the non-regeneration interval. The regeneration interval has a symmetrical shape whose center corresponds to the $\pi/2$ phase point of the induced voltage waveform, and the non-regeneration interval has a symmetrical shape whose center corresponds to the $\pi$ phase point of the induced voltage waveform.

With this control device, the excitation interval is set to a symmetrical interval with the $\pi/2$ phase point as the center, and the non-excitation interval is set as a symmetrical interval with the $\pi$ phase point as the center, so it is possible to improve the drive efficiency with the excitation intervals. Also, the regeneration interval is set as a symmetrical interval with the $\pi/2$ phase point as the center, and the non-regeneration interval is set as a symmetrical interval with the $\pi$ phase point as the center, so it is possible to improve the regeneration efficiency with the regeneration intervals.

Note that the present invention can be realized in various modes, for example, it may be realized as an electric motor, a control method, a control circuit thereof, an actuator using these, an electronic equipment, household electrical equipment, robot, and moving body.

BRIEF DESCRIPTION OF THE DRAWINGS

FIG. 3A is a block diagram showing the internal constitution of the drive control unit;

FIGS. 3B-3E show operation of the drive control unit;

FIGS. 4A-4F show the correlation between the sensor output waveform and the drive signal waveform;

FIG. 5 is a block diagram showing the internal constitution of the PWM unit;

FIG. 6 is a timing chart showing the operation of the PWM unit during forward rotation of the motor;

FIG. 7 is a timing chart showing the operation of the PWM unit during reverse rotation of the motor;

FIG. 9 is a timing chart showing the relationship between the variable resistance value Rv and the excitation interval EP with the excitation interval setting unit;

FIGS. 11A and 11B are timing charts showing the operation of the encoder;

FIG. 15 is a timing chart showing the relationship between the variable resistance value Rgv and the regeneration interval GEP with the regeneration interval setting unit;

FIGS. 16A-16D show an exemplary application of the electric actuator to an electric automobile;

FIGS. 19A-19C show a method of determining the voltage control value Y;

DESCRIPTION OF THE PREFERRED EMBODIMENT

Next, we will describe embodiments of the present invention in the following sequence.
A. Overall Constitution of the Device:
B. Constitution and Operation of the Drive Control Unit:
C. Constitution and Operation of the Regeneration control unit:
D. Application example 1:
E. Application example 2:
F. Variation Examples:

A. Overall Constitution of the Device

Figure 1:
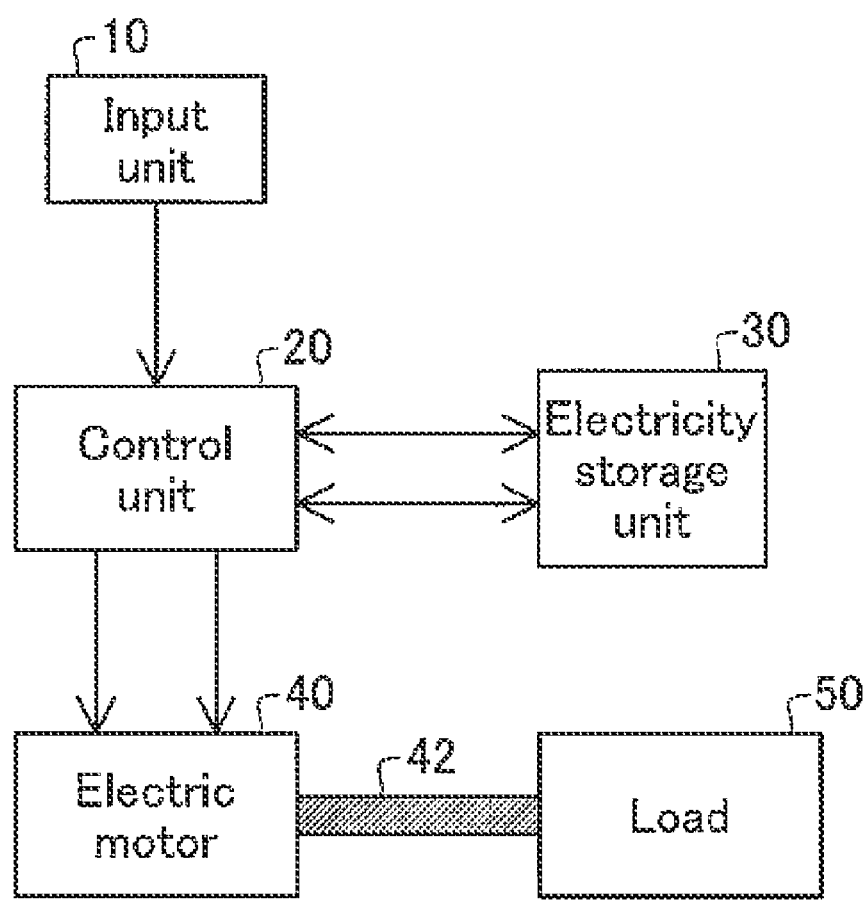
FIG. 1 is a block diagram showing the constitution of an electric actuator as an embodiment of the present invention.

FIG. 1 is a block diagram showing the constitution of an electrical actuator as an embodiment of the present invention. This electrical actuator has an input unit 1, a control unit 20, a electricity storage unit 30, an electric motor 40, and a load 50. The input unit 10 is a device for performing various types of input to the control unit 20, and can be constituted by an operating panel, and/or switches, for example. The control unit 20 performs control of the drive and regeneration of the electric motor 40 according to the input (commands) from the input unit 10. The regenerated power is stored in the electricity storage unit 30. A secondary battery or capacitor can be used as the electricity storage unit 30. The load 50 is linked to the electric motor 40 by a drive force transmission mechanism 42, and is driven by the electric motor 40. The drive force transmission mechanism 42 can be constituted by a gear train, and a rotating axis. A specific example of the load 50 will be described later.

Figure 2:
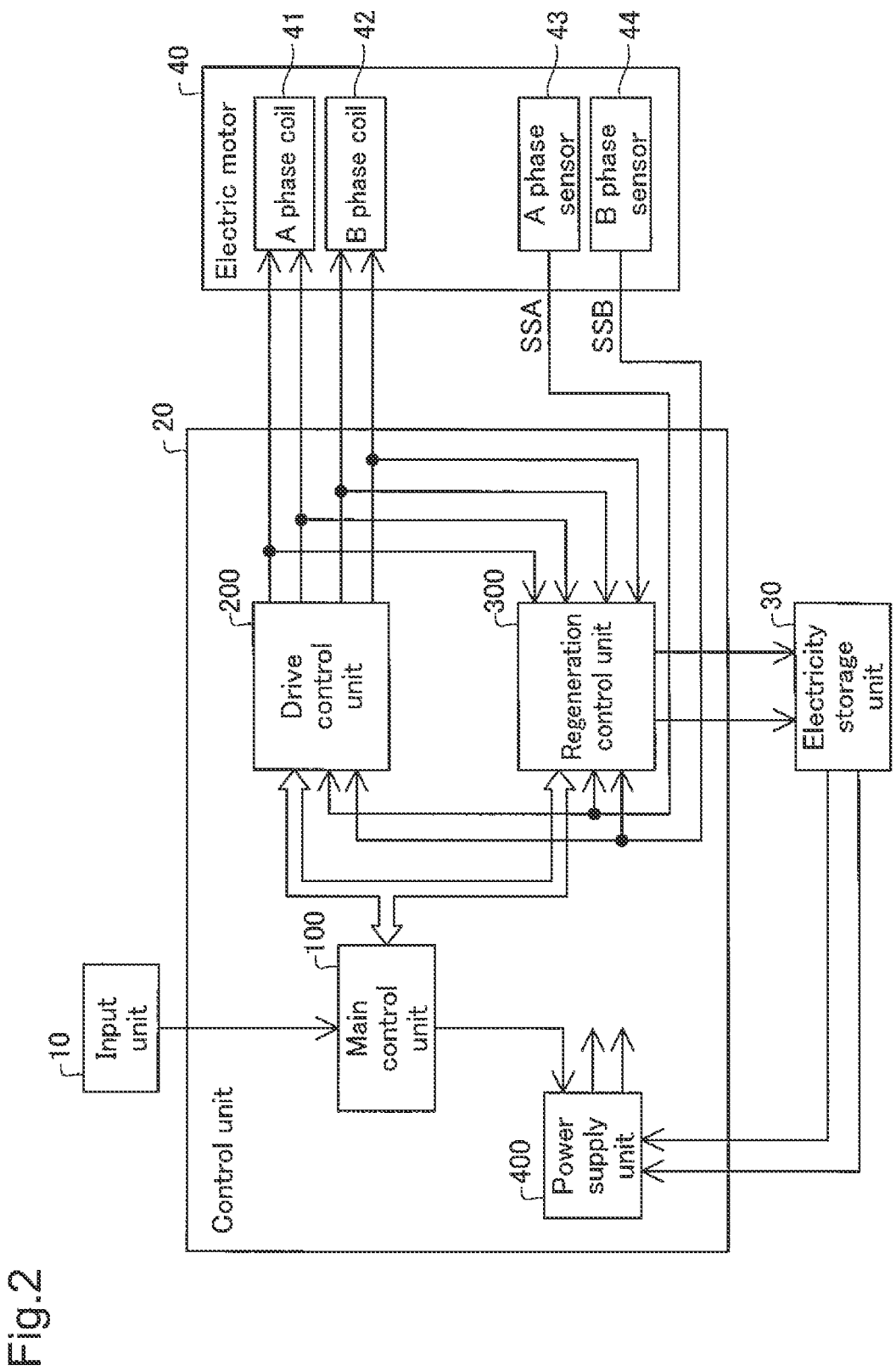
FIG. 2 is a block diagram showing the internal constitution of the control unit.

FIG. 2 is a block diagram showing the internal constitution of the control unit 20. The control unit 20 includes a main control unit 100, a drive control unit 200, a regeneration control unit 300, and a power supply unit 400. The main control unit 100 controls the drive control unit 200 and the regenerating unit 300 according to the commands from the input unit 10. The main control unit 100 may be constituted by a logic operation circuit that includes a CPU and a memory, for example. The drive control unit 200 is a circuit for controlling the drive of the electric motor 40, and the regeneration control unit 300 is a circuit for controlling the regeneration of power from the electric motor 40. The power supply unit 400 is a circuit for supplying power to each unit within the control unit 20. The details of the functions of each of these units will be described later.

The electric motor 40 is a two-phase motor equipped with the A phase coil 41 and B phase coil 42, and their respective position sensors 43 and 44. The A phase coil 41 and the B phase coil 42 each contain one or more electromagnetic coils. The electric motor 40 is further equipped with one or more permanent magnets (not illustrated). With a typical electric motor, the coils 41 and 42 are installed on a stator, and the permanent magnet is installed on a rotor. However, the reverse of this constitution is also possible, and as an embodiment of the present invention, it is possible to use a motor for which the coils 41 and 42 and the permanent magnet are respectively installed on two driven members for which the mutual positional relationship changes. The A phase sensor 43 and the B phase sensor 44 generate sensor outputs SSA and SSB respectively indicating the positions of the A phase coil 41 and the B phase coil 42 in relation to the permanent magnet. The A phase sensor output SSA and the B phase sensor output SSB are sine wave shaped signals, for example. These sensor outputs have almost the same waveform shape as the back electromotive force of the A phase coil 41 and the B phase coil 42. The waveform of the back electromotive force also depends on the coil shape and on the positional relationship of the magnets and the coils, but normally this is a sine wave or a waveform close to a sine wave. Note that "back electromotive force" is also called "induced voltage." Note that it is possible to use Hall ICs equipped with Hall elements as the sensors 43 and 44, for example.

Generally the electric motor functions as an energy conversion device for mutually converting mechanical energy and electrical energy. Then, the back electromotive force of the coils is electrical energy that is converted from the mechanical energy of the electric motor. Therefore, when converting the electrical energy applied to the coils to mechanical energy (specifically, when driving the motor), it is possible to drive the motor with maximum efficiency by applying voltage of the same waveform as the back electromotive force. Note that the energy conversion efficiency is relatively low near the center point of the sine-wave-shaped back electromotive force waveform (near voltage 0), and conversely the energy conversion efficiency is relatively high near the peak of the back electromotive force waveform. When the motor is driven with an applied voltage of the same waveform as the back electromotive force, a relatively high voltage is applied during periods when the energy conversion efficiency is high, so the motor efficiency increases. On the other hand, for example when the motor is driven with a simple rectangular wave, a significant voltage is applied even near the position at which the back electromotive force is almost 0 (at the center point of the sine waveform), so the motor efficiency decreases. Also, when a voltage is applied during the period when the energy conversion efficiency is low in this way, there is the problem that vibration and noise occur. In this way, the energy conversion efficiency is relatively high near the peak of the back electromotive force waveform, so if drive and regeneration are performed during this period, it is possible to increase the drive efficiency and the regenerating efficiency.

B. Consttution and Operation of the Drive Control Unit

FIGS. 3A to 3E show the internal configuration and operation of the drive control unit 200. The drive control unit 200 includes a PWM controller 240 and a driver circuit 250. The driver circuit 250 is an H bridge circuit having a plurality of switching elements. The PWM controller 240 has a basic clock generating circuit 510, a 1/N frequency divider 520, a PWM unit 530, a moving direction register 540, multipliers 550, 552, encoders 560, 562, AD converters 570, 572, a voltage control value register 580, and an excitation interval setting unit 590.

The main control unit 100 supplies a braking control signal PK to the PWM unit 530. The main control unit 100 also supplies a waveform switching signal Ssw to the encoders 560, 562, and a drive enable signal Denb to the excitation interval setting unit 590. The functions of these signals will be described later.

The basic clock generating circuit 510 is a circuit that generates a clock signal PCL of prescribed frequency, and is composed of a PLL circuit, for example. The frequency divider 520 generates a clock signal SDC of a frequency which is 1/N the frequency of the clock signal PCL. The value of N is set to a prescribed constant. This value of N has been previously established in the frequency divider 520 by the main control unit 100. The PWM unit 530 generates AC drive signals DRVA1, DRVA2, DRVB1, DRVB2 (FIG. 2) in response to the clock signals PCL, SDC, multiplication values supplied by the multipliers 550, 552, a moving direction value RI supplied by the moving direction value register 540, positive/negative sign signals Pa, Pb supplied by the encoders 560, 562, and excitation interval signals Ea, Eb supplied by the excitation interval setting unit 590. This operation will be discussed later.

A value RI indicating the direction of rotation of the motor is established in the moving direction value register 540 by the main control unit 100. In the present embodiment, the motor undergoes forward rotation when the moving direction value RI is L level, and reverse rotation when it is H level.

The other signals Ma, Mb, Pa, Pb, Ea, Eb presented to the PWM unit 530 are determined in the manner described below. The multiplier 550, the encoder 560, and the AD converter 570 are circuits for use in Phase A; the multiplier 552, the encoder 562, and the AD converter 572 are circuits for use in Phase B. Since these circuit groups have identical operation, the discussion hereinbelow will mainly focus on operation of the Phase A circuits. It is assumed that various parameters for Phase A and those for Phase B are set equal to each other in the description below, but the parameter for Phase A and those for Phase B may be set at different values.

Note that with this specification, when referring to both the Phase A and the Phase B together, the code endings "a" and "b" (indicating Phase A and Phase B) are omitted. For example, when it is not necessary to distinguish between the Phase A and Phase B multiplication values Ma and Mb, these are referred to collectively as "multiplication values M." The same convention is used for the other codes or reference numerals as well.

The magnetic sensor output SSA is presented to the AD converter 570. This sensor output SSA has a range, for example, of from GND (ground potential) to VDD (power supply voltage), with the middle point (=VDD/2) being the middle point of the output waveform (the point at which the sine wave passes through the origin). The AD converter 570 performs AD conversion of this sensor output SSA to generate a digital value of sensor output. The output of the AD converter 570 has a range, for example, of FFh to 0 h (the "h" suffix denotes hexadecimal), with the values of 80 h and 7 Fh being both related to the middle point of the output waveform.

The encoder 560 converts the range of the sensor output value subsequent to AD conversion, and sets the value of the middle point of the output waveform to 0. As a result, the sensor output value Xa generated by the encoder 560 assumes a prescribed range on the positive side (e.g. +127 to 0) and a prescribed range on the negative side (e.g. 0 to −127). However, the value presented by the encoder 560 to the multiplier 560 is the absolute value of the sensor output value Xa; the positive/negative sign thereof is presented to the PWM unit 530 as the positive/negative sign signal Pa.

The voltage control value register 580 stores a voltage control value Ya established by the main control unit 100. This voltage control value Ya, together with the excitation interval signal Ea discussed later, functions as a value for setting application voltage of the motor; the value Ya can take a value of 0 to 1.0, for example. Assuming an instance where the excitation interval signal Ea has been set in such a way that all intervals are excitation intervals, with no non-excitation intervals being provided, Ya=0 will mean that the application voltage is zero, and Ya=1.0 will mean that the application voltage is the maximum value. The multiplier 550 performs multiplication of the voltage control value Ya and the sensor output value Xa output from the encoder 560 and conversion to an integer; the multiplication value Ma thereof is presented to the PWM unit 530.

FIGS. 3B to 3E depict operation of the PWM unit 530 in instances where the multiplication value Ma takes various different values. Here, it is assumed that all intervals are excitation intervals, with no non-excitation intervals. The PWM unit 530 is a circuit that, during each cycle of the clock signal SDC, generates one pulse with a duty factor of Ma/N. Specifically, as shown in FIGS. 3B to 3E, in association with increase of the multiplication value Ma, the pulse duty factor of the drive signals DRVA1, DRVA2 increases as well. The first drive signal DRVA1 is a signal that generates a pulse only when the sensor output SSA is positive, and the second drive signal DRVA2 is a signal that generates a pulse only when the sensor output SSA is negative; in FIGS. 3B to 3E, these are shown together. For convenience, the second drive signal DRVA2 is shown as negative pulses.

FIGS. 4A to 4D depict correspondence relationships between sensor output waveforms and waveforms of drive signals generated by the PWM unit 530. In the drawing, "Hiz" denotes high impedance. As explained in FIGS. 3A to 3E, the Phase A drive signals DRVA1, DRVA2 are generated by PWM control using the analog waveform of the Phase A sensor output as-is. This is true for the Phase B drive signals DRVB1, DRVB2 as well. Consequently, it is possible for the Phase A coils and Phase B coil to be presented with effective voltage that exhibits change in level corresponding to change in the sensor outputs SSA, SSB.

The PWM unit 530 is constituted so as to output drive signals only during the excitation intervals indicated by excitation interval signals Ea and Eb supplied from the excitation interval setting unit 590, and to not output drive signals during the intervals other than the excitation intervals (non-excitation intervals). FIGS. 4E and 4F show the drive signal waveform when the excitation interval EP and the non-excitation interval NEP are set by the excitation interval signals Ea and Eb. With the excitation intervals EP, the drive signal pulses of the FIGS. 4C and 4D are generated as is, and with the non-excitation intervals NEP, the drive signal pulses are not generated. If the excitation intervals EP and the non-excitation intervals NEP are set in this way, voltage is not applied to the coil near the center point of the back electromotive force waveform (specifically, near the center point of the sensor output), so it is possible to further improve the motor efficiency. Note that the excitation interval EP is preferably set to a symmetrical interval with its center being at the peak of the back electromotive force waveform (induced voltage waveform), and the non-excitation interval NEP is preferably set to a symmetrical interval with its center being at the center point (middle point) of the back electromotive force waveform. In other words, the excitation interval EP is preferably set to a symmetrical interval with its center being at the $\pi/2$ phase point when the position at which the polarity reverses for the waveform of the induced voltage induced at the electromagnetic coil by the movement of the permanent magnet is defined to be the $\pi$ phase point. Also, the non-excitation interval NEP is preferably set to a symmetrical interval with its center being at the $\pi$ phase point of the induced voltage waveform. Note that with a brushless motor that uses an iron core, it is normal for phase delay to occur with the current in relation to the voltage. In this case, it is preferable to approximately match the current waveform peak and the induced voltage waveform peak by performing angular advance control.

As discussed previously, if the voltage control value Ya is set to a value less than 1, the multiplication value Ma will be small compared with the voltage control value Ya. Consequently, effective adjustment of application voltage through the voltage control value Ya is possible as well.

As will be understood from the preceding discussion, with the motor of the present embodiment, it is possible to adjust the application voltage using both the voltage control value Ya and the excitation interval signal Ea. This is true for Phase B as well. In preferred practice, relationships between the preferred application voltage on the one hand, and the voltage control value Ya and the excitation interval signal Ea on the other, will be stored in advance in table format in memory in the drive control circuit 200. By so doing it is possible, when the drive control circuit 200 has received the preferred application voltage from the outside, for the main control unit 100 in response to the drive signal to set the voltage control value Ya and the excitation interval signal Ea in the PWM controller 240. Adjustment of application voltage does not require the use of both the voltage control value Ya and the excitation interval signal Ea, and it would be acceptable to use either of these instead.

FIG. 5 is a block diagram depicting the internal configuration of the PWM unit 530 (FIG. 3A). The PWM unit 530 has counters 531, 532, EXOR circuits 533, 534, and drive waveform shaping units 535, 536. The counter 531, the EXOR circuit 533, and the drive waveform shaping unit 535 are circuits used for Phase A; the counter 532, the EXOR circuit 534, and the drive waveform shaping unit 536 are circuits used for Phase B. Their operation will be described below.

FIG. 6 is a timing chart depicting operation of the PWM unit 530 during forward rotation of the motor. There are shown the two clock signals PCL and SDC, the moving direction value RI, the excitation interval signal Ea, the multiplication value Ma, the positive/negative sign signal Pa, the counter value CM1 in the counter 531, the output SI of the counter 531, the output S2 of the EXOR circuit 533, and the output signals DRVA1, DRVA2 of the drive waveform shaping unit 535. For each cycle of the clock signal SDC, the counter 531 repeats an operation decrementing the count value CM1 to 0 in sync with the clock signal PCL. The initial value of the count value CM1 is set to the multiplication value Ma. In FIG. 6, for convenience in illustration, negative multiplication values Ma are shown as well; however, the counter 531 uses the absolute values |Ma| thereof. The output S1 of the counter 531 is set to H level when the count value CM1 is not 0, and drops to L level when the count value CM1 is 0.

The EXOR circuit 533 outputs a signal S2 representing exclusive OR of the positive/negative sign signal Pa and the moving direction value RI. When the motor is running forward, the moving direction value RI is L level. Consequently, the output S2 of the EXOR circuit 533 will be a signal identical to the positive/negative sign signal Pa. The drive waveform shaping unit 535 generates the drive signals DRVA1, DRVA2 from the output S1 of the counter 531 and the output S2 of the EXOR circuit 533. Specifically, in the output S1 of the counter 531, the signal during intervals in which the output S2 of the EXOR circuit 533 is L level is output as the drive signal DRVA1, and the signal during intervals in which the output S2 of the EXOR circuit 533 is H level is output as the drive signal DRVA2. The excitation interval signal Ea falls to L level in proximity to the right end in FIG. 6, thereby setting up a non-excitation interval NEP. Consequently, neither of the drive signals DRVA1, DRVA2 is output during this non-excitation interval NEP, and a state of high impedance is maintained.

Note that a braking control signal PK is supplied to drive waveform forming units 535 and 536 (FIG. 5), and there are cases when the drive signals DRVA1, DRVA2, DRVB1, and DRVB2 are changed according to this braking control signal PK. This operation will be described later.

As can be understood from the description above, the counter 531 functions as a PWM signal generation circuit for generating PWM signals based on the multiplication value Ma. Also, the drive waveform forming unit 535 functions as a mask circuit for masking the PWM signals according to the excitation interval signal Ea.

FIG. 7 is a timing chart depicting operation of the PWM unit 530 during reverse rotation of the motor. When the motor is running in reverse, the moving direction value RI is H level. As a result, the two drive signals DRVA1, DRVA2 switch position with those in FIG. 6, and it will be appreciated that the motor runs in reverse as a result. The Phase B circuits 532, 534, 536 of the PWM unit 530 operate the same as those discussed above.

Figure 8A:
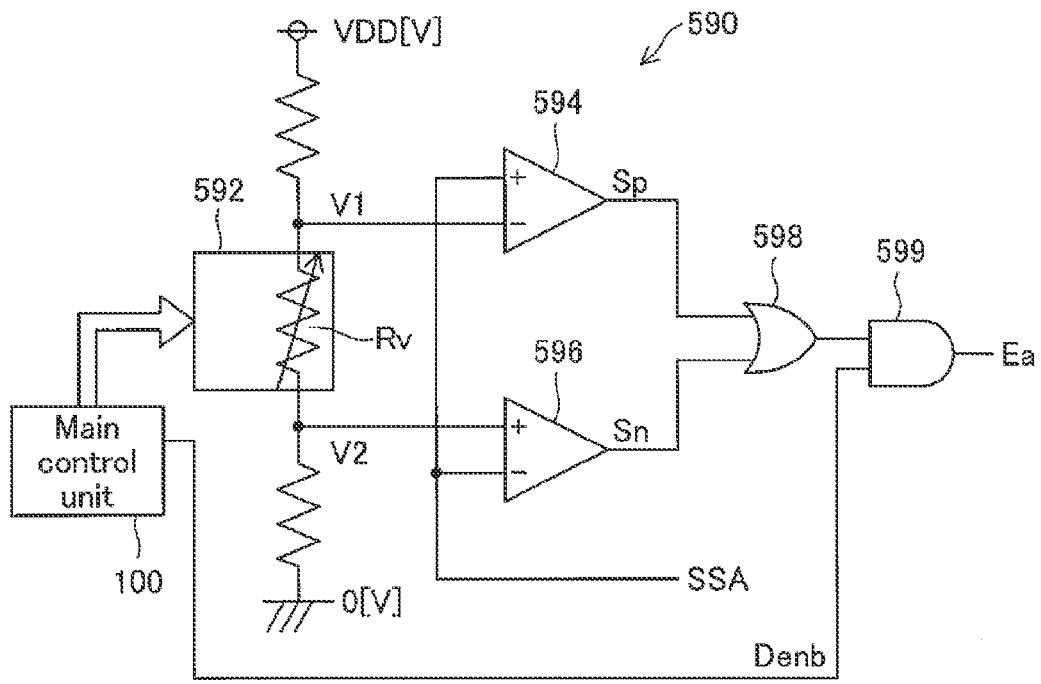
FIG. 8A is a block diagram showing the internal constitution of the excitation interval setting unit.

FIG. 8A shows the internal constitution and operation of the excitation interval setting unit 590. The excitation interval setting unit 590 has an electronic variable resistor 592, voltage comparators 594 and 596, an OR circuit 598, and an AND circuit 599. The resistance value Rv of the electronic variable resistor 592 is set by the main control unit 100. The voltage V1 and V2 of both ends of the electronic variable resistor 592 are applied to the input terminal of one of the voltage comparators 594 and 596. The sensor output SSA is supplied to the input terminal of the other of the voltage comparators 594 and 596. Note that with FIG. 8A, the circuit for the B phase is omitted for the convenience of illustration. The output signals Sp and Sn of the voltage comparators 594 and 596 are input to the OR circuit 598. The output of the OR circuit 598 is input together with the drive enable signal Denb supplied from the main control unit 100 to the two input terminals of the AND circuit 599. The output of the AND circuit 599 is the excitation interval signal Ea for discriminating between the excitation interval and the non-excitation interval. As will be described later, the drive enable signal Denb may be used to set the motor at a non-excitation state.

Figure 8B:
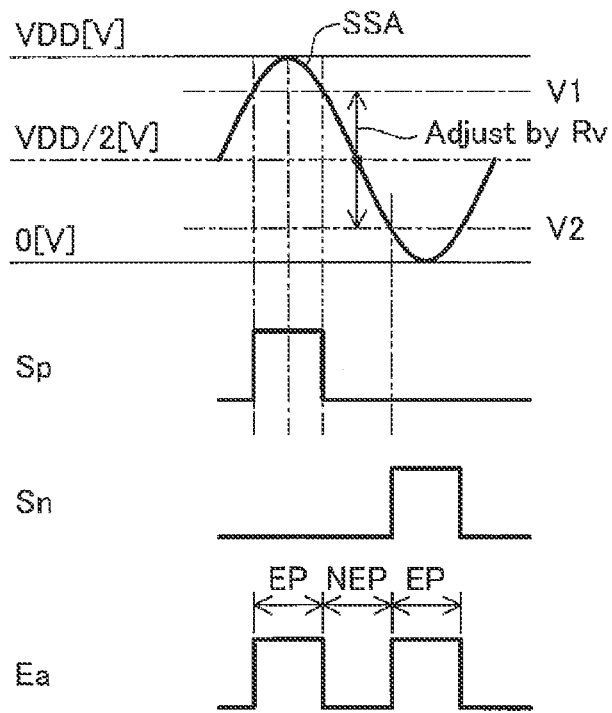
FIG. 8B shows operation of the excitation interval setting unit.

FIG. 8B depicts operation of the excitation interval setting unit 590. The voltages V1, V2 at the terminals of the electronic variable resistor 592 are modified by adjusting the resistance Rv. Specifically, the terminal voltages V1, V2 are set to values of equal difference from the median value of the voltage range (=VDD/2). In the event that the sensor output SSA is higher than the first voltage V1, the output Sp of the first voltage comparator 594 goes to H level, whereas in the event that the sensor output SSA is lower than the second voltage V2, the output Sn of the second voltage comparator 596 goes to H level. The excitation interval signal Ea is a signal assuming the logical sum of the these output signals Sp, Sn. Consequently, as shown at bottom in FIG. 8B, the excitation interval signal Ea can be used as a signal indicating excitation intervals EP and non-excitation intervals NEP. The excitation intervals EP and non-excitation intervals NEP are established by means of adjustment of the variable resistance Rv by the main control unit 100.

The setting of the excitation interval EP and the non-excitation interval NEP may be executed by any circuitry other than the main control unit 100. This is also the case with the function of the main control unit 100 as an adjuster unit for adjusting both the control value Ya and the excitation interval signal Ea in response to a request from an external device, such as a motor output request, thereby achieving the required output.

At the startup of the motor, it is preferable that the excitation intervals EP is set as large as possible while the non-excitation intervals NEP is set as small as possible. This is because when the motor is stopping at a position corresponding to the non-excitation interval NEP, the PWM signals are masked by the drive waveform shaping unit 535 (FIG. 5), and the motor may not be able to start. Therefore the non-excitation interval NEP is preferably set at the smallest value in its permissible range at the motor startup. The smallest value of the non-excitation interval NEP is preferably a non-zero value. This is because the zero value of the non-excitation interval NEP may cause a countercurrent in the driver circuit 250 (FIG. 3A) at the timing when the polarity of the sensor output SSA (that is, the polarity of the drive signals) is reversed, thereby damaging the switching transistors.

FIG. 9 is a timing chart showing the relationship of the variable resistance value Rv and the excitation interval EP. Here, the sensor output SSA, the variable resistance value Rv, the excitation interval signal Ea, and the drive signals DRVA1+DRVA2 are shown. In this example, the variable resistance value Rv takes four values of 0Ω, 8Ω, 16Ω, and 24 within its full range from 0 to 32Ω. When the variable resistance value Rv is the minimum value of 0Ω, almost all the intervals are excitation intervals EP. On the other hand, when the variable resistance value Rv is increased, there is a reduction in the excitation intervals EP, and an increase in the non-excitation intervals NEP.

Note that even when the variable resistance value Rv is set to its minimum value, the non-excitation interval NEP may be set at a specific small non-zero length in order to prevent reversed current from flowing the switching elements during voltage switching. This kind of operation can be realized by providing small fixed resistance in series in the electronic variable resistor 592 of FIG. 8A, for example (specifically, between the output terminals of the voltages V1 and V2). Alternatively, it is possible to realize the same kind of operation by also having the minimum value of the variable resistance value Rv be a non zero value.

As shown at the bottom of FIG. 9, when a large torque is necessary (e.g. during startup), almost all the intervals are excitation intervals EP, and on the other hand, when a small torque is sufficient (e.g. when at constant speed), the partitioning of the excitation intervals EP and the non-excitation intervals NEP is decided so that there are small excitation intervals EP and large non-excitation intervals NEP.

Figure 10:
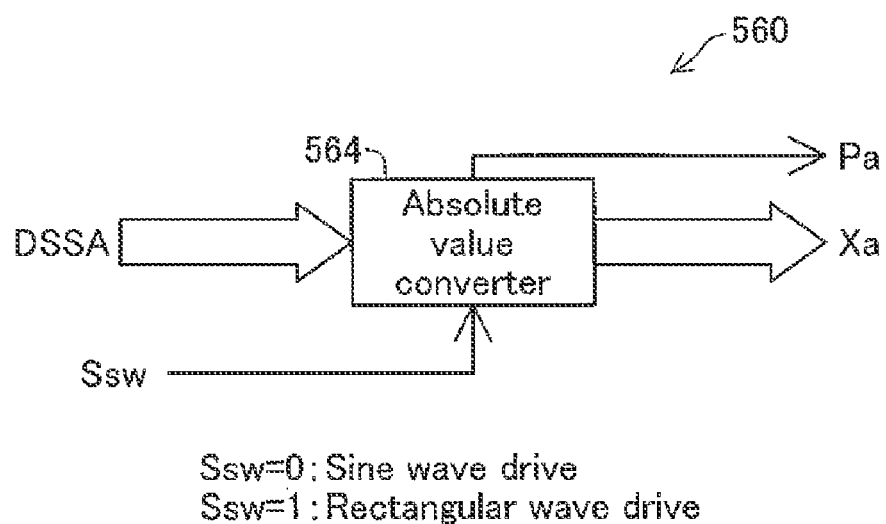
FIG. 10 is a block diagram showing another constitution of the encoder.

FIG. 10 is a block diagram showing the structure of the encoder 560. The encoder 560 includes an absolute value converter 562. The absolute value converter 562 generates the sensor output value Xa and the positive/negative sign signal Pa, responsive to the sensor output DSSA which is converted by the A-D converter 570 (FIG. 3A), and the waveform switching signal Ssw. The waveform switching signal Ssw is used to select either a sinusoidal wave drive operation or a rectangular wave drive operation. The absolute value converter 562 generates the sensor output value Xa indicating the level change of the sensor signal DSSA when Ssw is at the zero or low level, while it generates the value Xa having a constant value irrespective of the level change of the sensor signal DSSA when Ssw is at the 1 or high level FIGS. 11A and 11B are timing charts showing the operation of the encoder 560. As shown in FIG. 11A, the sensor output value Xa and the positive/negative sign signal Pa are generated in the following manner when Ssw is set at the zero level.

(1a) if the digital signal value DSSA is equal to or less than a predetermined value (e.g. 128):

$$Xa = DSSA - 128$$

Pa=1 (indicating that the sensor output waveform is in the positive range)

(1b) if the digital signal value DSSA is more than the predetermined value (e.g. 128):

Xa=127−DSSA

Pa=0 (indicating that the sensor output waveform is in the negative range)

In other words, the sensor output value Xa has a value indicating the level change of the sensor output SSA when Ssw is set at the 0 level.

As shown in FIG. 11B, the sensor output value Xa and the positive/negative sign signal Pa are generated in the following manner when Ssw is set at the 1 level.

(2a) if the digital signal value DSSA is equal to or less than a predetermined value (e.g. 128):

Xa=127 (constant)

Pa=1 (indicating that the sensor output waveform is in the positive range)

(2b) if the digital signal value DSSA is more than the predetermined value (e.g. 128):

Xa=127 (constant)

Pa=0 (indicating that the sensor output waveform is in the negative range)

In other words, the sensor output value Xa has a constant value irrespective of the level change of the sensor output SSA when Ssw is set at the 1 level.

The encoder 560 can select one of the two operation modes shown in FIGS. 11A and 11B to execute the selected operation mode according to a requirement. For example, the rectangular wave operation mode may be used to assure the startup of the motor, while the sinusoidal wave operation mode may be used after the startup to improve the motor efficiency.

Note that the PWM unit 530 (PWM control circuit) is constituted as a circuit that obtains the multiplication value Ma by multiplying the changing signal value Xa that changes in time series and the voltage control value Ya, and generates the PWM signal by performing PWM control on this multiplication value Ma. This kind of PWM unit 530 simulates a waveform proportional to the changing signal SSA by adjusting the voltage control value Ya, and is capable of generating PWM signals having an effective amplitude according to the level of the voltage control value Ya. Therefore, it is possible to easily generate suitable PWM signals in accordance with the control request to the motor.

Figure 12A:
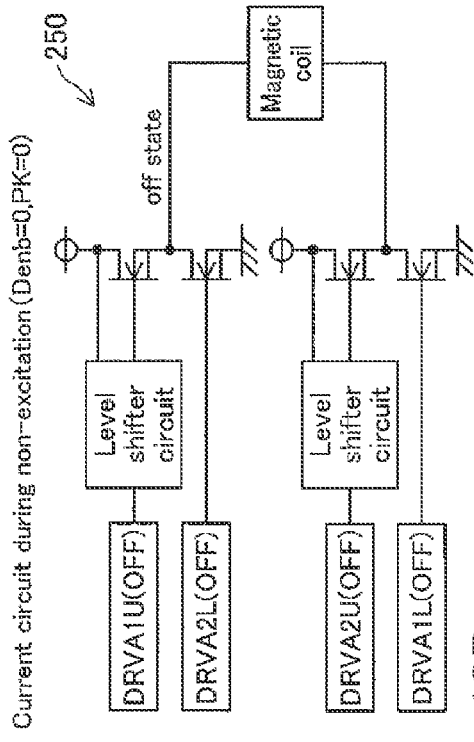
FIGS. 12A-12D show the operating states of the driver circuit according to the drive enable signal Denb and the braking control signal PK.

FIGS. 12A through 12D show operation of the driver circuit responsive to the operation enable signal Denb and the braking control signal PK. As shown in FIG. 12A, the driver circuit 250 includes four switching transistors 251-254, and level shifters 255, 256 for adjusting the level of the drive signals supplied to the upper arm transistors 251, 253. The level shifters 255, 256 may be omitted.

The driver circuit 250 is supplied with four drive signals DRVA1U, DRVA2L, DRVA2U, DRVA1L from the PWM unit 530 (FIG. 5). The drive signals DRVA1U, DRVA2L, DRVA2U, DRVA1L are set responsive to the operation enable signal Denb and the braking control signal PK to achieve various states as described below.

When Denb=1 and PK=0, the motor is put in the normal operation state shown in FIG. 12A. In this state, electric current flows in the first current direction IA1 when a pair of the drive signals DRVA1U, DRVA1L are set at the On state while the other pair of the drive signals DRVA2U, DRVA2L are set at the Off state. Conversely, the electric current flows in the second current direction IA2 when the first pair of the drive signals DRVA1U, DRVA1L are set at the Off state while the other pair of the drive signals DRVA2U, DRVA2L are set at the On state. The motor is driven according to these drive signals.

Figure 12B:
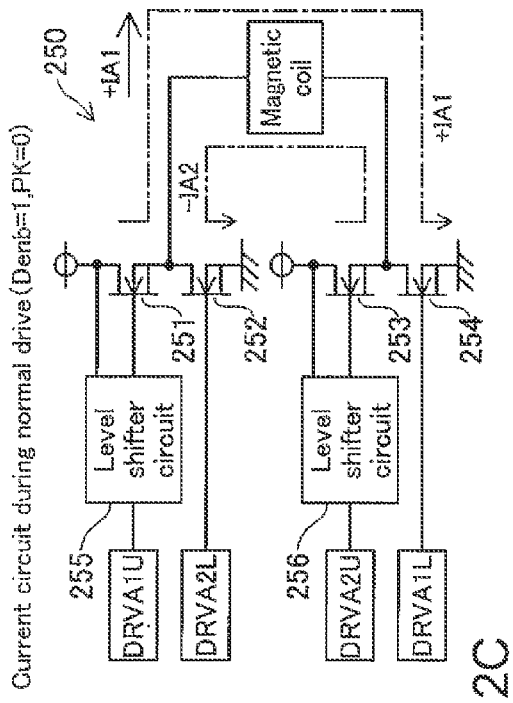

When the operation enable signal Denb is set at the zero level, the excitation signal Ea is set at the 0 level, making all the drive signals at the low (or off) level, whereby the motor is put at the non excitation state shown in FIG. 12B. In this state, the magnetic coils are electrically separated from the power supply and no current flows in the magnetic coils in response to rotation of the rotor, whereby the rotor may freely rotate. In other words, the zero level of the operation enable signal Denb puts the rotor in the free rotation state. If the rotor rotates in this state, the magnetic coils generate electricity by the back electromotive force, and it is possible to regenerate electric power as described later in detail.

Figure 12C:
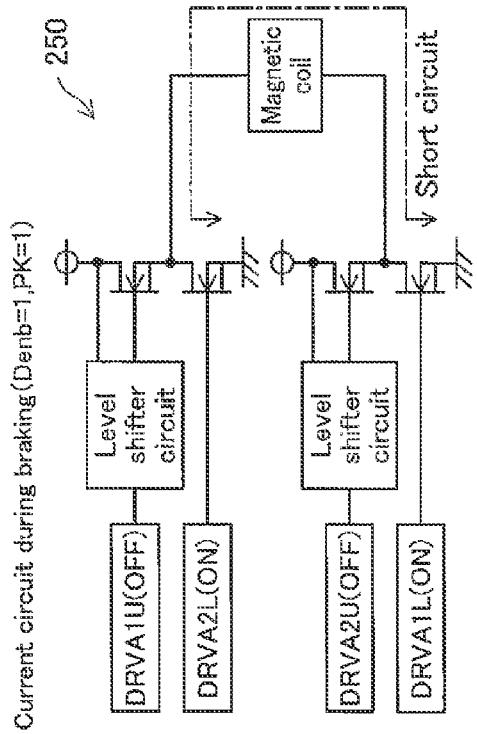
Figure 12D:
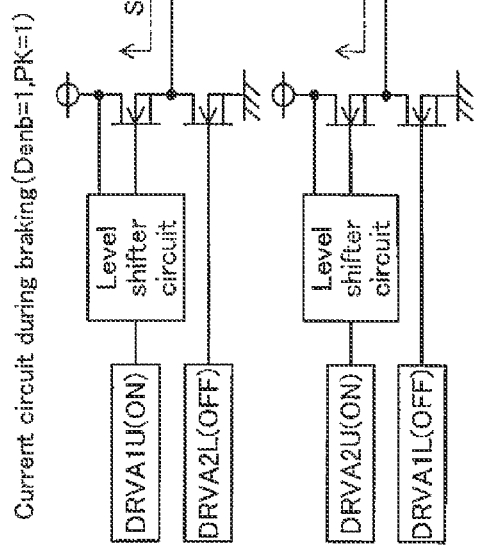

When, on the other hand, the braking control signal PK is set at the 1 level, the motor is put in the braking state shown in FIGS. 12C and 12D. In the state of FIG. 12C, the drive signals DRVA1U, DRVA2U for the upper arm transistors are at the H (or On) level while the other drive signals DRVA1L, DRVA2L for the lower arm transistors are at the L (or Off) level, and the coils are short circuited accordingly. In the state of FIG. 12D, the drive signals DRVA1U, DRVA2U for the upper arm transistors are at the L (or Off) level while the other drive signals DRVA1L, DRVA2L for the lower arm transistors are at the H (or On) level; this also makes the coils short circuited. In this way, the 1 level of the braking control signal PK will generate the drive signals to make the magnetic coils to be short circuited, whereby the rotor will be prevented from rotation due to the back electromagnetic force caused by the rotation. This state corresponds to a parking mode described later.

In this way, when controlling the motor in the modes shown in FIGS. 12A and 12B, the first set of drive signals DRVA1U and DRVA1L indicate the same level with each other (on or off), and the second set of drive signals DRVA2U and DRVA2L also indicate the same level with each other (on or off). Therefore, when controlling the motor in these modes, it holds that DRVA1U=DRVA1L and DRVA2U=DRVA2L. With FIGS. 4A-4F, FIG. 6, and FIG. 7 described previously, mainly considering the modes in FIGS. 12A and 12B, the first set of two drive signals DRVA1U and DRVA1L are not distinguished and are noted together as "DRVA1." The same convention is also used for the second set of drive signals DRVA2U and DRVA2L. Meanwhile, during the braking mode shown in FIGS. 12C and 12D, the first set of drive signals DRVA1U and DRVA1L exhibit mutually opposite levels, and the second set of drive signals DRVA2U and DRVA2L also exhibit mutually opposite levels. In light of this, with FIGS. 12A to 12D, the four drive signals DRVA1U, DRVA2L, DRVA2U, and DRVA1L are indicated using different reference codes. Note that it is also possible to constitute the circuit such that the braking modes shown in FIGS. 12C and 12D are not performed, and in this case, it is not necessary to distinguish between the first set of drive signals DRVA1U and DRVA1L, and it is also not necessary to distinguish between the second set of drive signals DRVA2U and DRVA2L.

As described above, with the drive control unit 200, as described with FIGS. 3A-3E through FIG. 9, the two parameters of the voltage control value Ya and the excitation interval Ea may be adjusted to change the driving state of the motor including torque and rotation speed accordingly. Also, as described with FIG. 10 and FIGS. 11A, 11B, the drive control unit 200 may select either one of the rectangular wave drive and the sine wave drive according to the waveform switching signal Ssw. The drive control unit 200 is further able to select either one of the driving mode, the non-excitation mode, and the braking mode according to the drive enable signal Denb and the brake control signal PK as described in FIGS. 12A-12D. However, it is also possible to constitute the drive control unit as a circuit that does not utilize the non-excitation mode or the braking mode.

C. Constitution and Operation of the Regeneration Control Unit

Figure 13:
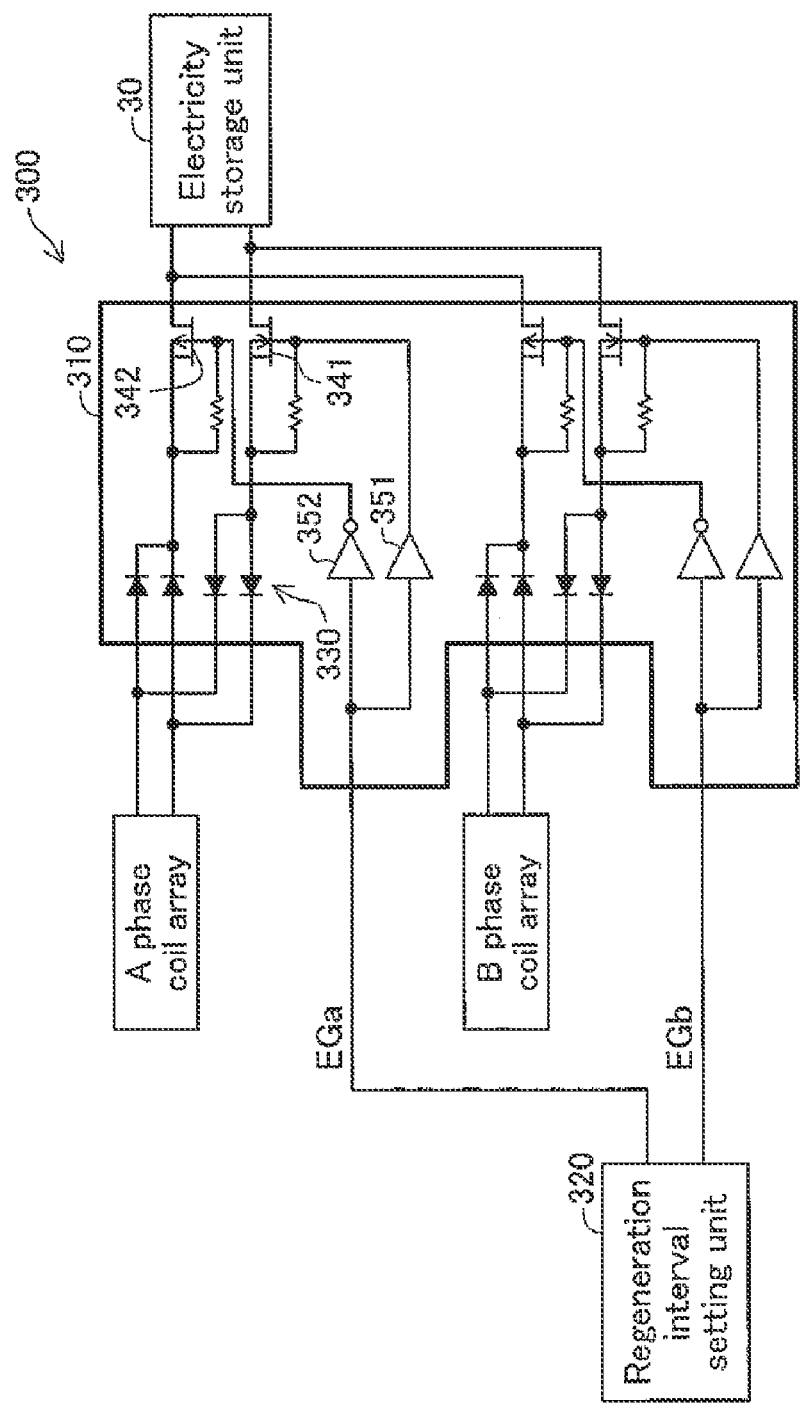
FIG. 13 is a circuit diagram showing the internal constitution of the regeneration control unit.

FIG. 13 is a circuit diagram showing the internal constitution of the regeneration control unit 300. This regeneration control unit 300 has the function of regenerating power in the state shown in FIG. 12B. The regeneration control unit 300 has a rectifier circuit 310 and a regeneration interval setting unit 320. The rectifier circuit 310 has as the A phase circuitry a full-wave rectifier circuit 330 containing a plurality of diodes, two gate transistors 341 and 342, a buffer circuit 351, and an inverter circuit 352 (NOT circuit). Note that the same circuits are also provided for the B phase. The output terminals of the gate transistors 341 and 342 are connected to the electricity storage unit 30. The regeneration interval setting unit 320 generates an A phase regeneration interval setting signal EGa and a B phase regeneration interval signal EGb, and supplies these to the rectifier circuit 310. The circuit constitution is the same for the A phase and the B phase, and following we will mainly describe the A phase circuitry.

The alternating current generated by the A phase coil array during power regeneration is rectified by the full-wave rectifier circuit 330. The regeneration interval signal EGa and its inversion signal are applied to the gates of the gate transistors 341 and 342, and the gate transistors 341 and 342 are controlled to be on or off accordingly. Therefore, the regeneration power is accumulated in the electricity storage unit 30 during the period that the regeneration interval signal EGa is at high level, and on the other hand, regeneration of power is prohibited during the period that the regeneration interval signal EGa is at low level.

Figure 14:
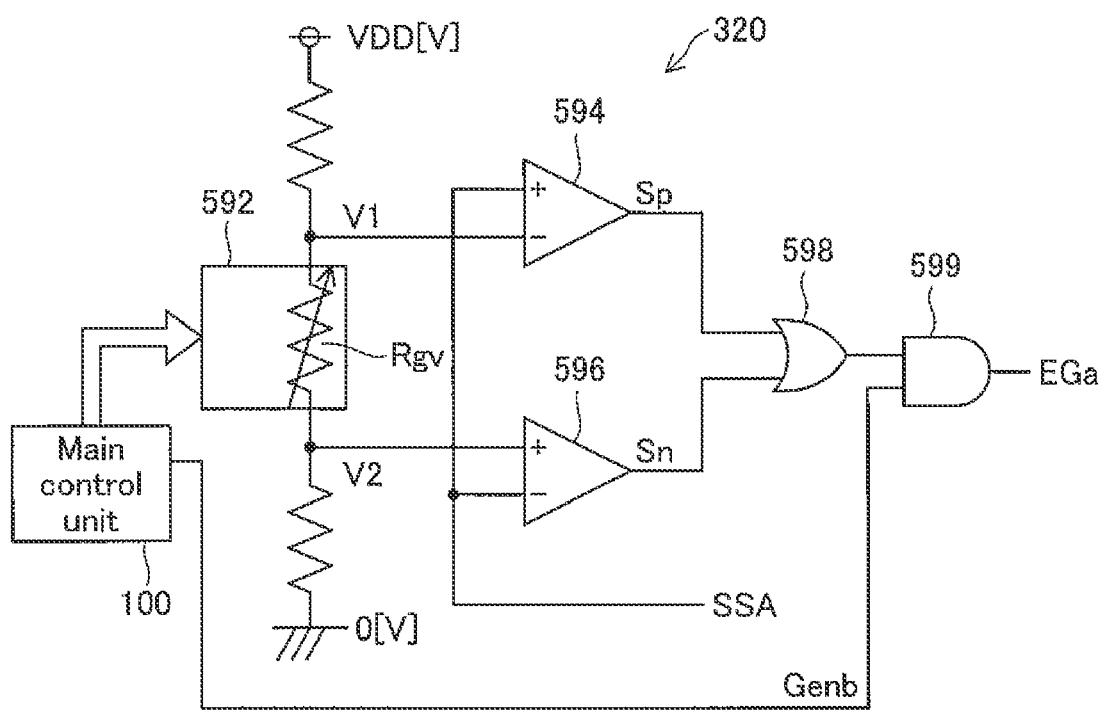
FIG. 14 shows the internal constitution of the regeneration interval setting unit.

FIG. 14 shows the internal constitution of the regeneration interval setting unit. As can be understood from comparing with FIG. 8A, the regeneration interval setting unit 320 has almost the same circuit configuration as the excitation interval setting unit 590. However, the regeneration enable signal Genb is input to the AND circuit 599 instead of the drive enable signal Denb, and the output of this AND circuit 599 becomes the regeneration interval signal EGa.

FIG. 15 is a timing chart showing the relationship between the variable resistance value Rgv and the regeneration interval at the regeneration interval setting unit. Here, the back electromotive force waveform, the sensor output SSA, the variable resistance value Rgv, the regeneration interval signal EGa, and the regenerated force are shown. The variable resistance value Rgv takes four values of 0Ω, 8Ω, 16Ω, and 24Ω in this example. When the variable resistance value Rgv is 0Ω, almost all the intervals are regeneration intervals GEP. On the other hand, when the variable resistance value Rgv is increased, the regeneration intervals GEP are decreased, and the non-regeneration intervals NGEP are increased.

As shown at the bottom of FIG. 15, when a strong braking force is required, almost all the periods are regeneration intervals GEP, whereby a large volume of power is regenerated. On the other hand, when a small braking force is sufficient, less power is regenerated by having fewer regeneration intervals GEP and more non-generating intervals NGEP. The relationship between the required braking force and the regeneration intervals GEP, specifically, the relationship between the required braking force and the variable resistance value Rgv is stored in advance in the memory within the main control unit 100. Therefore, the main control unit 100 is able to set the variable resistance value Rgv to a suitable value according to the motor's required braking force. Note that when regeneration is not necessary, the main control unit 100 may set the regeneration intervals GEP to zero regardless of the value of the variable resistance value Rgv by setting the regeneration enable signal Genb to low level.

As described above, the regeneration control unit 300 limits the period in which power is recovered from the A phase coil array and the B phase coil array according to the regeneration interval signals EGa and EGb, and thus it is possible to adjust the regenerated power volume and braking force. Note that the regeneration interval GEP is preferably set to a symmetrical interval with its center being the π/2 phase point when the position at which the polarity of the waveform of the induced voltage induced at the electromagnetic coil by the movement of the permanent magnet is inverted is defined to be the π phase point. It is also preferable that the non-regeneration interval NGEP is set to a symmetrical interval with its center being the π phase point of the induced voltage waveform.

D. Application Example 1

FIGS. 16A-16D show an example of applying the electric actuator of an embodiment of the present invention to an electric automobile. With this example, as the input unit 10 shown FIG. 1, three input units 11 to 13 are employed. The first input unit 11 is the accelerator pedal, the second input unit 12 is the shift lever, and the third input unit 13 is the brake pedal. The accelerator pedal 11 has a stepping amount SP which changes in a range from 0 to 1.0. Similarly for the break pedal 13, its stepping amount BK changes in a range from 0 to 1.0. The shift lever 12 changes a torque conversion rate TN which takes values of P and 100% to 20%. Here, the value "P" means Parking. Also, the % value of the torque conversion ratio TN at a certain shift position is a value of the gear ratio of the maximum speed shift position divided by the gear ratio of that certain shift position. For example, when the gear ratio of the lowest shift position is 4.0, and the gear ratio of the maximum speed shift position is 0.8, the torque conversion ratio TN for the lowest shift position is 0.8/4.0=20%. Note that with this example, the electric automobile is an automatic transmission vehicle, and if the shift lever 12 is set to the drive position, the gear ratio is changed automatically during driving.

FIG. 16D shows an example of driving the electric automobile, and it shows the changes in the three input values SP, TN, and BK, and the changes in the motor target rotation speed ωt. When the automobile is stopped, SP=0, TN=P, and BK=1, but when the automobile is started, these input values SP, TN, and BK change at various times, and accordingly the motor target rotation speed ωt also changes. Note that the main control unit 100 (FIG. 2) determines the target rotation speed ωt as well as the motor target torque according to the input values SP, TN, and BK, but these are omitted from the illustration in FIG. 16D. Note that as the input values, it is also possible to use the output signals of the various sensors (e.g. vehicle speed sensor) to measure the operating state of the electrical automobile, but here, to make the description simple, other input values are omitted.

The main control unit 100 supplies the following signals and parameters described previously to the drive control unit 200 and the regeneration control unit 300 according to the rotation speed and torque target values, and sets the respective operating states.
(1) Waveform switching signal Ssw (FIG. 10)
(2) Voltage control value Y (Ya, Yb in FIG. 3A)
(3) Excitation interval signal E (FIG. 9)
(4) Drive enable signal Denb (FIGS. 12A-12D)
(5) Braking control signal PK (FIGS. 12A-12D)
(6) Regeneration interval signal EG (FIG. 15)
(7) Regenerating enable signal Genb (FIG. 14)

Figure 17:
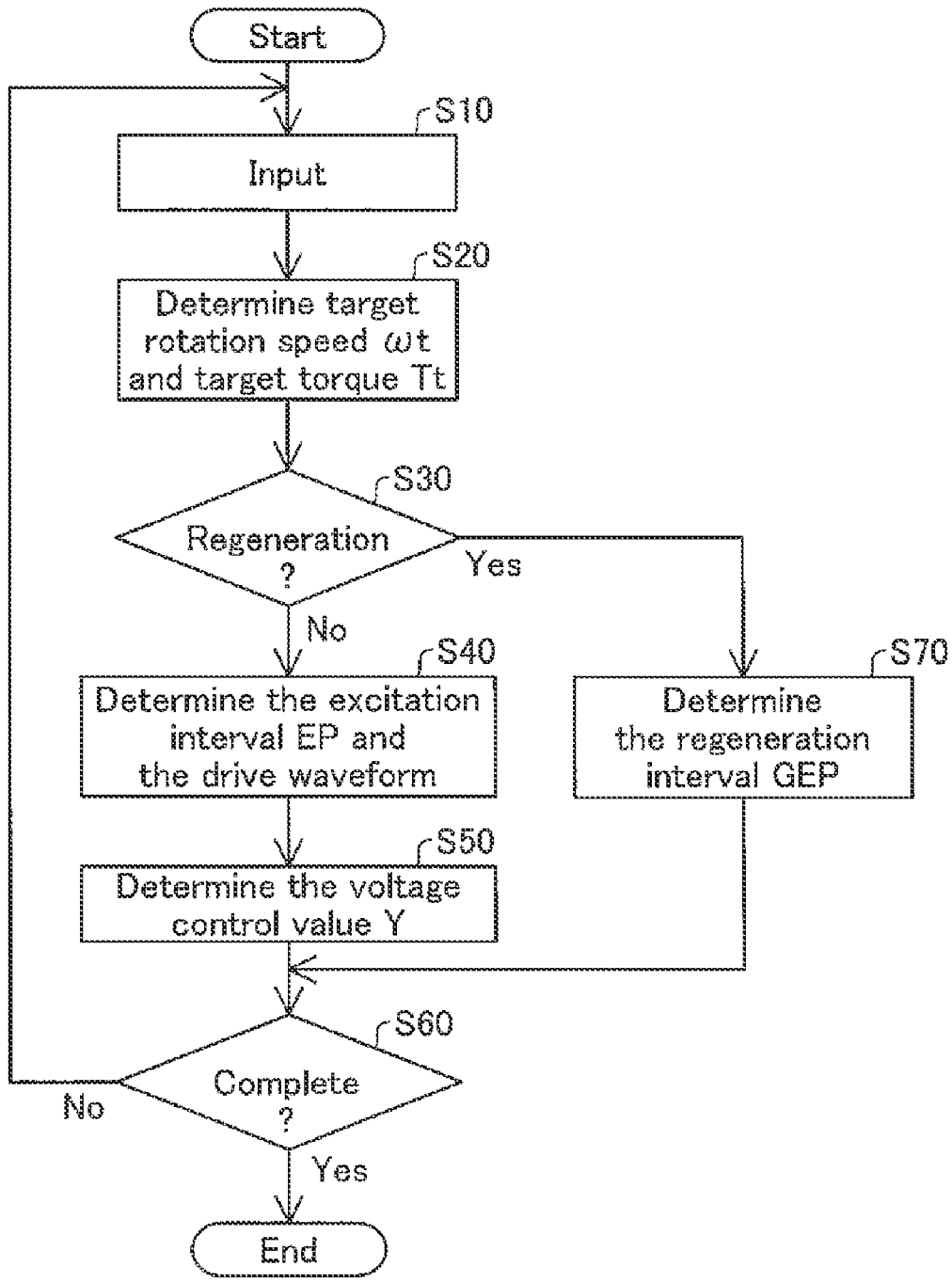
FIG. 17 is a flow chart showing an example of the control routine of the electric automobile by the main control unit.

FIG. 17 is a flow chart showing an example of the control routine of an electric automobile by the main control unit 100. At step S10, the various types of input values are input to the main control unit 100 from the input unit 10. The processing from the step S20 and thereafter is executed by the main control unit 100. First, at step S20, the target rotation speed ωt and the target torque Tt are determined from the various input values. Note that the correlation between the various input values and the target values ωt and Tt may be stored in advance in the memory within the main control unit 100 in various formats such as a lookup table, or a map.

At step S30, whether or not to perform power regeneration is determined. This may be determined based on whether or not the brake pedal 13 is stepped on, for example. When power regeneration is not performed, at step S40, the excitation interval EP (specifically, the variable resistance value Rv of the excitation interval setting unit 590) and the drive waveform (specifically, the value of the waveform switching signal Ssw) are determined, and at step S50, the voltage control value Y is determined. Note that when driving without performing regeneration, the drive enable signal Denb is also set to high level, but with FIG. 17, description of the other signals is omitted.

Figure 18:
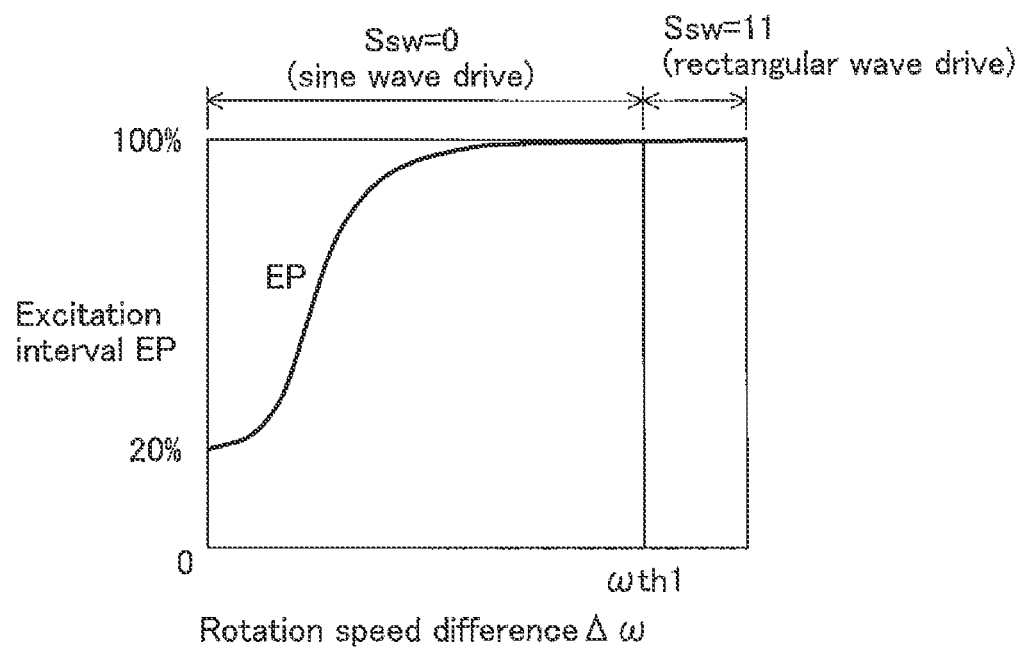
FIG. 18 shows an example of the method of selecting the excitation interval EP and the drive waveform.

FIG. 18 shows an example of the method of selecting the excitation interval EP and the drive waveform. The horizontal axis is the rotation speed difference Δω (difference between the target rotation speed and the actual rotation speed), and the vertical axis shows the value of the excitation interval EP. It is preferable that the excitation interval EP increases as the rotation speed difference Δω increases. With this arrangement, it is possible to reach the target rotation speed more quickly. Note that with this example, the relationship between the rotation speed difference Δω and the excitation interval EP is an S shaped non-linear relationship, but the relationship of these may also be another non-linear correlation, or a linear correlation.

FIG. 18 also shows that a sine wave is selected as the drive waveform when the rotation speed difference Δω is less than a predetermined threshold value ωth1, and a rectangular wave is selected when the threshold value ωth1 is exceeded. With this arrangement, it is possible to initiate startup with a relatively large torque during motor startup, for example. Note that the method of determining the excitation interval EP and the drive waveform is not limited to this, but it is also possible to employ various other methods. For example, it is also possible to select a rectangular wave in a specific low rotation speed range during motor startup as the drive waveform, and to select a sine wave after that.

FIGS. 19A-19C show an example of the method of determining the voltage control value Y. FIG. 19A shows the effect of the voltage control value Y on the motor torque/rotation speed characteristics when the excitation interval EP is 100%. The brushless motor of this embodiment has characteristics as a direct current motor, so the rotation speed w and the torque T have the linear relationship that drops to the right as shown in FIG. 19A. This linear relationship is written in the following equation:

$$\omega = \omega_0 - (R\alpha/K_T K_E)T \qquad (1)$$

Here, $\omega_0$ is the intercept, $R\alpha$ is a coil resistance, $K_T$ is the torque constant, and $K_E$ is the back electromotive force constant. Moreover, as is well known, the torque constant $K_T$ and the back electromotive force constant $K_E$ have larger values the more efficient the motor is, so the motor has higher torque with a lower rotation speed.

Meanwhile, as described with reference to FIGS. 3A-3E, the PWM control unit 240 multiplies the A phase sensor output Xa by the voltage control value Ya to make the multiplication value Ma, and generates a PWM signal proportional to this multiplication value Ma. The same convention is used for the B phase. Therefore, the effective voltage applied to the motor is proportional to the voltage control value Y (Ya, Yb). As a result, as shown in FIG. 19A, when the voltage control value Y decreases, the effective voltage also decreases, and we can see that the line of the torque/rotation speed characteristics also approaches the origin point.

FIG. 19B shows the effect of the excitation interval EP on the motor torque/rotation speed characteristics when the voltage control value Y is 1.0. When there is a decrease in the excitation intervals EP, the effective voltage applied to the motor decreases. However, as described with reference to FIGS. 4A-4F, the excitation interval EP is set as a symmetrical interval with its center being the peak of the back electromotive force waveform (induced voltage waveform) in the present embodiment. The symmetrical interval with its center being the peak of the back electromotive force waveform is an interval with high conversion efficiency between mechanical energy and electrical energy, and when there is a decrease in the excitation intervals EP, drive force is generated only during a period of good conversion efficiency. Therefore, the torque constant $K_T$ and the back electromotive force constant $K_E$ values of the above equation (1) become larger when there is a decrease in the excitation intervals EP, and the line slope decreases. As a result, when there is a decrease in the excitation intervals EP, as shown in FIG. 19B, the line indicting the torque/rotation speed characteristics approaches the origin point, and that slope becomes smaller.

FIG. 19C depicts the graphs of FIGS. 19A and 19B together. The solid line graph shows the characteristics when the voltage control value Y changes while the excitation interval EP is fixed at 100%, and the dotted line graph shows the characteristics when the excitation interval EP changes while the voltage command Y is fixed at 1.0. With this graph, the target point Pt is defined by the target torque Tt and the target rotation speed ωt. There are two combinations of the voltage control value Y and the excitation interval EP that realize this target point Pt as shown in FIG. 19C. However, in actuality, we can see that there is a very large number of the voltage control values Y and the excitation intervals EP that realize the target point Pt. In light of this, based on the characteristics of FIG. 18, the main control unit 100 first determines the excitation interval P from the rotation speed difference Δω, and after that, uses the determined excitation interval EP to determine the voltage control value Y that will realize the target point Pt(Tt, ωt). By doing this, it is possible to easily determine these two parameters EP and Y according to the target point Pt(Tt, ωt). However, this determination method is one example, and it is also possible to use other methods to determine the excitation interval EP and the voltage control value Y. For example, it is also possible to use a lookup table that uses the target values Tt and ωt and the actual speed of the vehicle as input and that uses the excitation interval EP and the voltage control value Y as the output. It is also possible to set the voltage control value Y to always be a fixed value (e.g. 1.0), and to adjust only the excitation interval EP.

Figure 20:
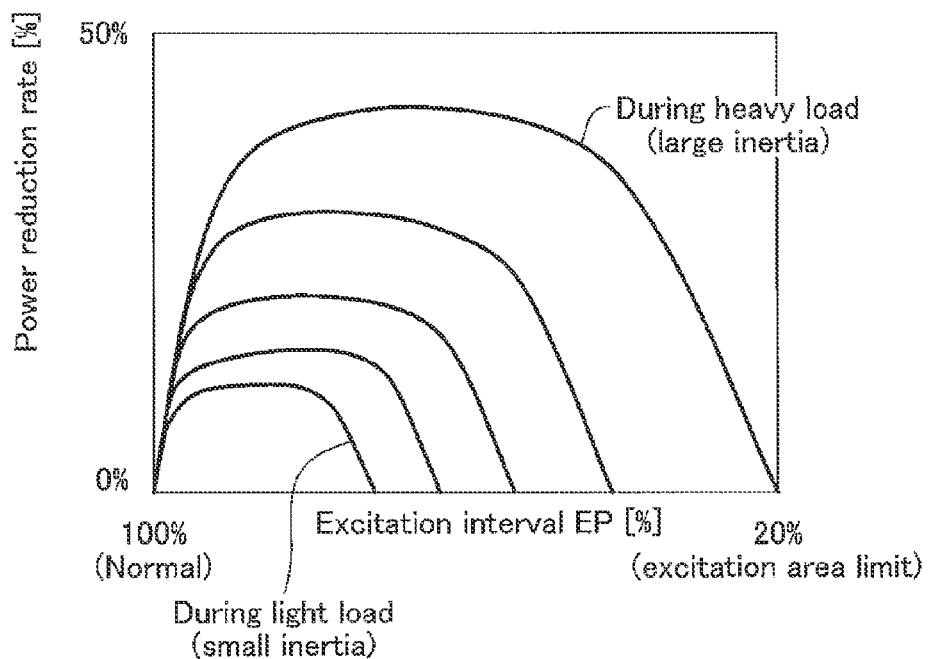
FIG. 20 is a graph showing the relationship between the size of the excitation interval EP and the power reduction rate.

FIG. 20 is a graph showing the relationship between the size of the excitation interval EP and the power reduction rate. Here, the "power reduction rate" means the amount of rise in efficiency. Each solid line indicates the power reduction rate for the same load. When the value of the excitation interval EP becomes smaller with the same load (moving to the right side in the drawing), the voltage control value Y becomes a higher value. In FIG. 20, we will assume that in virtual terms, a value larger than 1 may be used for the voltage control value Y. When there is a heavy load (when the inertia force is large), and there is an almost steady rotation state, it is possible to decrease the excitation interval EP to a small value of close to 20% due to inertia force. Meanwhile, when the load is light (when the inertia force is small), it is possible to maintain a larger value for the excitation interval EP even with a steady rotation state because the inertia force is small. As described previously, when the excitation interval EP is small, the motor is driven in periods in which the conversion efficiency is high between the mechanical energy and electrical energy, so the motor efficiency increases, and the power reduction rate becomes larger. Note that the reason that the efficiency decreases when the excitation interval EP is reduced beyond a certain level with a fixed load is because when the excitation interval EP becomes excessively small, the voltage control value Y becomes an excessively large value, and the PWM signal effective waveform approaches a simple rectangular wave, thereby decreasing the efficiency.

At step 30 in FIG. 17, when it is decided to perform power regeneration, at step S70 the regeneration interval GEP (specifically, the variable resistance value Rgv of the regeneration interval setting unit 320) is determined, and the process moves to step S60.

Figure 21:
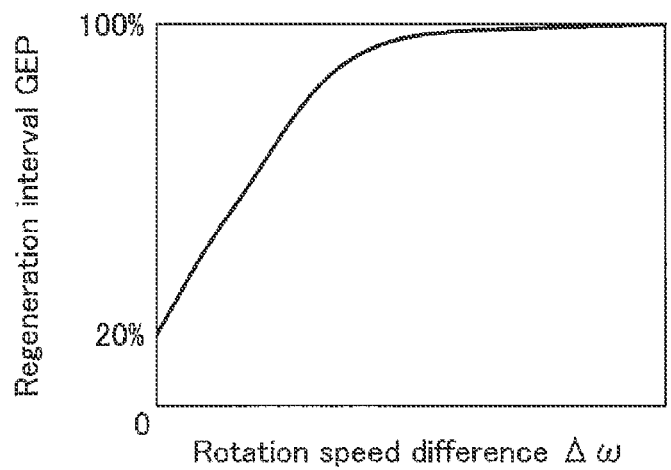
FIG. 21 is a graph showing a method for determining the regeneration interval GEP.

FIG. 21 is a graph showing an example of the method for determining the regeneration interval GEP. It is preferable that the regeneration interval GEP increases as the rotation speed difference Δω increases. With this arrangement, it is possible to approach the target speed more quickly, and to regenerate more power. With this example, the relationship between the rotation speed difference Δω and the regeneration interval GEP is non-linear, but it is also possible to have their correlation be linear. Note that when performing regeneration, the regeneration enable signal Genb and the braking control signal PK are set to high level, but with FIG. 17, these signals are omitted.

At step S60 in FIG. 17, whether or not the control operation is completed is determined, and if it is not completed, the process returns to step 10, and the processing of steps S10 to S70 are repeatedly executed. In this way, with the application example on an electric automobile, determination is performed based on the plurality of input values SP, TP, and BK regarding: the target rotation speed and the target torque, whether to perform drive or regeneration, and the excitation interval EP or the regeneration interval GEP. Accordingly, it is possible to operate the motor in a suitable state according to the input values. Also, the excitation intervals EP and the regeneration intervals GEP are respectively set independently from each other, so it is possible to perform high efficiency operation respectively for drive and regeneration. Note that the state of TN=P in FIG. 16D may also be realized with the settings of FIG. 12C or 12D.

E. Application Example 2

Figure 22A:
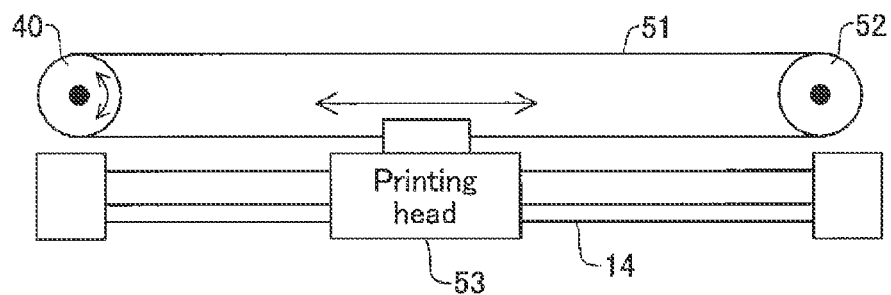
FIGS. 22A and 22B show an exemplary application of the electric actuator to a printer.

FIG. 22A shows an example of applying the electric actuator of the embodiment of the present invention to a printer. With this printer, an endless belt 51 is stretched across between the motor 40 and a pulley 52. A printing head 53 is linked to the endless belt 51. The printing head 53 is installed to be able to slide along an encoder 14 that functions as a position sensor. When the endless belt 51 driven by the motor 40 rotates, the printing head 53 moves to the left-right direction of the drawing accordingly. During this movement, by ejecting ink from the printing head 53, it is possible to print an image on a printing medium. With this application example, the encoder 14 functions as the input unit 10 of FIG. 1.

Figure 22B:
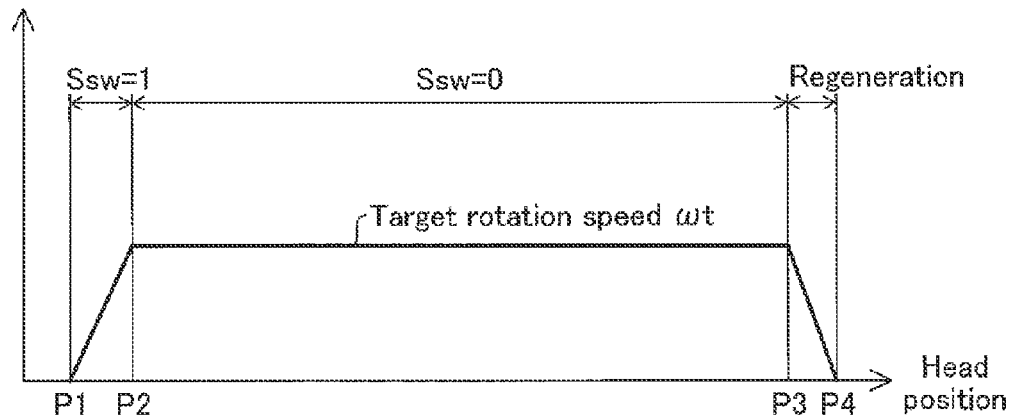

FIG. 22B shows an example of the relationship between the head position and the motor target rotation speed. Here, the printing head 53 is assumed to move between the left side position P1 and the right side position P4. Between the left side position P1 and the next specified position P2, the target rotation speed cot increases linearly. The timing at which the movement of the printing head 53 starts correlates to the timing at which the motor 40 starts up, so during this period, a rectangular wave with a large starting torque is selected as the drive waveform. Between the positions P2 and P3, the target rotation speed cot is kept at a fixed value. During this period, a sine wave with good efficiency is selected as the drive waveform. Between the positions P3 and P4, the target rotation speed cot decreases linearly, and power is regenerated accordingly.

Note that the relationship between the position of the printing head 53 and the target rotation speed cot and drive waveform may be stored in advance in the memory within the main control unit 100 (FIG. 2). The same is also true for the relationship between the position of the printing head 53 and other parameters (EP, GEP and the like), but here, the description of other parameter values is omitted. With this example, there is one input value (the position of the printing head 53), but various control parameters are determined according to this input value. However, in this case as well, it is possible to control the motor in a desirable mode by setting the various control parameters appropriately such as the drive waveform, the excitation interval EP, the regeneration interval GEP according to this input value.

F. Variation Examples

Note that the present invention is not limited to the embodiments and aspects noted above, and it is possible to implement various aspects within a scope that does not stray from the gist of the invention, with the following variation examples being possible, for example.

F1. Variation Example 1

With the embodiments noted above, the main control unit 100 supplies the following signals and parameters to the drive control unit 200 and the regeneration control unit 300 according to the rotation speed and torque target values, and set the respective operating states.
(1) Waveform switching signal Ssw (FIG. 10)
(2) Voltage control value Y (Ya, Yb in FIG. 3A)
(3) Excitation interval signal E (FIG. 9)
(4) Drive enable signal Denb (FIGS. 12A-12D)
(5) Braking control signal PK (FIGS. 12A-12D)
(6) Regeneration interval signal EG (FIG. 15)
(7) Regenerating enable signal Genb (FIG. 14)

However, it is possible to construct a control device according to the present invention such that the control device determines not all but only some of these according to one or more input values. For example, the present invention may be applied to circuitry that determines the excitation interval signal E and the regeneration interval signal EG according to one or more input values to use these signals for the drive and regeneration operation, without using the other of the above signals.

F2. Variation Example 2

With the embodiments noted above, the constitution and operation of a two-phase drive control circuit is described, but circuitry according to the present invention may also be constituted as a drive control circuit of any number of phases other than two phases, such as a single-phase drive control circuit, and a three-phase or greater drive control circuit. It is also possible to omit part of the circuit elements such as the moving direction register 540, and the excitation interval setting unit 590. Note that the control unit 20 is preferably implemented as a semiconductor integrated circuit (IC).

F3. Variation Example 3

The present invention may be applied to an actuator for any device other than an electric automobile or printer. For example, the motor according to the present invention may be also used as a motor for a moving body or robot.

Figure 23:
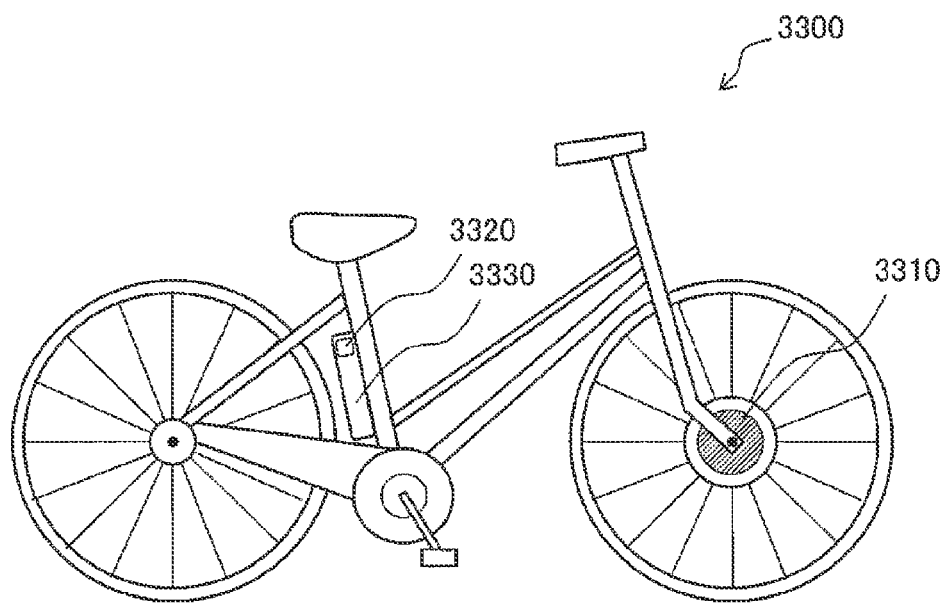
FIG. 23 shows an electric automobile (electrically assisted vehicle) as an example of the mobile object that uses the motor/generator of the embodiment of the present invention.

FIG. 23 illustrates an electric bicycle (electric-assisted bicycle) as an example of a moving body utilizing a motor according to the present invention. The bicycle 800 includes a motor 810 at the front wheel, and a control circuit 820 and a rechargeable battery 830 both attached on the frame under the saddle. The motor 810 powered by the battery 830 drives the front wheel to assist the run. During braking, the regenerated power by the motor 810 is charged in the battery 830. The control circuit 820 controls the drive and regeneration of the motor 810. Various brushless motors described above can be used as the motor 810.

Figure 24:
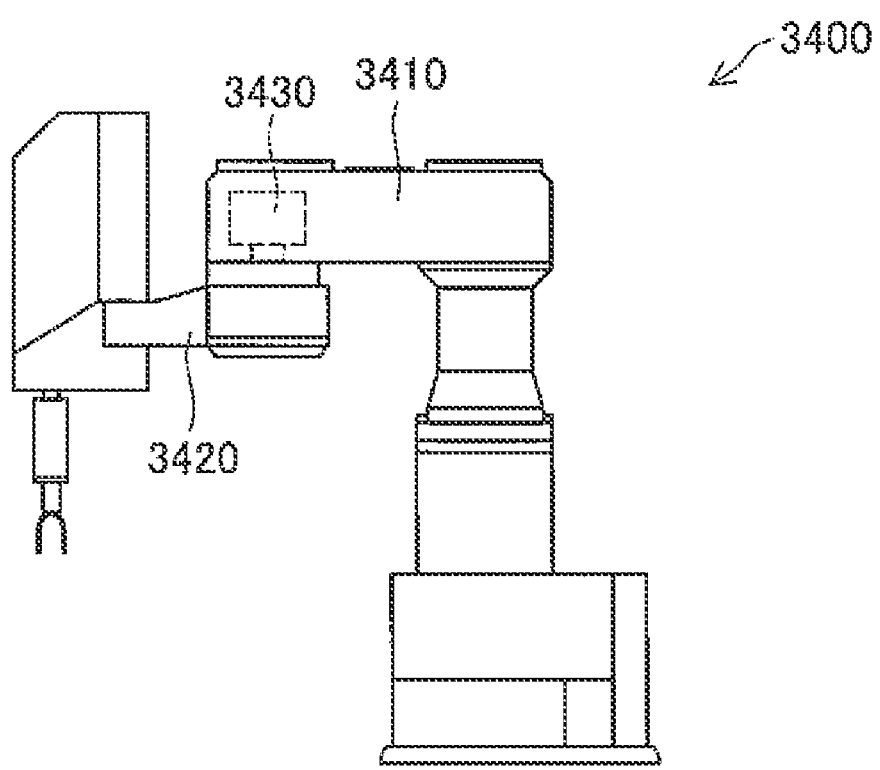
FIG. 24 shows an example of a robot using the motor of the embodiment of the present invention.

FIG. 24 illustrates a robot utilizing a motor according to the present invention. The robot 900 includes a first arm 910, a second arm 920, and a motor 930. The motor 930 is used to horizontally rotate the second arm 920 as a driven member for the motor. Various brushless motors described above can be used as the motor 930.

Figure 25:
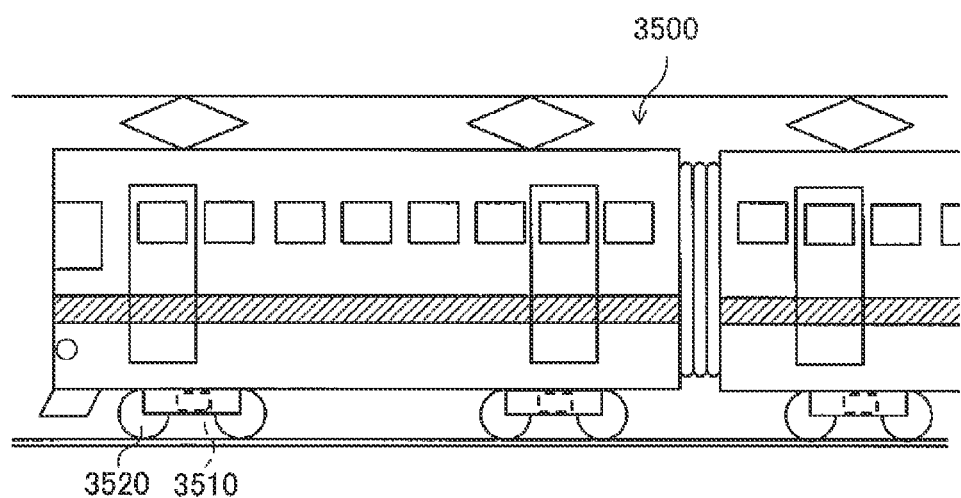
FIG. 25 shows a railroad car using the motor of the embodiment of the present invention.

FIG. 25 illustrates a railroad vehicle utilizing a motor according to the present invention. The railroad vehicle 3500 includes a motor 3510 and wheels 3520. The motor 3510 is used to drive the wheels 3520. The motor 3510 is also used as a generator during braking of the railroad vehicle 3500 to regenerate electric power. Various brushless motors described above can be used as the motor 3510.

What is claimed is:

1. A robot comprising:
an electric motor having an electromagnetic coil and a permanent magnet; and
a control device for controlling the electric motor,
wherein the control device includes a drive control unit that performs control for driving the electromagnetic coil,
wherein an induced voltage is induced at the electromagnetic coil responsive to movement of the permanent magnet, the induced voltage having a waveform whose polarity is reversed at a π phase point of the waveform,
the drive control unit includes:
an excitation interval setting unit that sets an excitation interval and a non-excitation interval such that voltage is applied to the electromagnetic coil during the excitation interval while not applied to the electromagnetic coil during the non-excitation interval, the excitation interval having a symmetrical shape whose center corresponds to a π/2 phase point of the induced voltage waveform, the non-excitation interval having a symmetrical shape whose center corresponds to the π phase point of the induced voltage waveform;

a multiplication unit that calculates a multiplication value by multiplying a signal value of a change signal indicating changes over time and a control value which can be set at a desired value within a specific range;

a PWM signal generating unit that generates PWM signals having a pulse width according to the multiplication value by performing PWM control on the multiplication value;

a mask circuit that generates drive signals of the electric motor by masking the PWM signal at the non-excitation interval; and an adjustment unit that adjusts both the control value and partition between the excitation interval and the non-excitation interval according to an output power request for the electric motor.

2. The robot in accordance with claim 1, wherein when the drive control unit is not performing either the drive control or regeneration control of the electric motor, the drive control unit maintains the electromagnetic coil in a high impedance state.

* * * * *